US012673407B2

(12) United States Patent
Wang et al.

(10) Patent No.: US 12,673,407 B2
(45) Date of Patent: Jul. 7, 2026

(54) OSCILLATING TOOL

(71) Applicant: Black & Decker Inc., New Britain, CT (US)

(72) Inventors: Yanchao Wang, Timonium, MD (US); Stephen W. Songy, Towson, MD (US); Tareq Khreim, Columbia, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/632,770

(22) Filed: Apr. 11, 2024

(65) Prior Publication Data

US 2024/0383121 A1 Nov. 21, 2024

Related U.S. Application Data

(63) Continuation of application No. 18/631,175, filed on Apr. 10, 2024.

(60) Provisional application No. 63/505,510, filed on Jun. 1, 2023, provisional application No. 63/505,516, filed on Jun. 1, 2023, provisional application No. 63/504,843, filed on May 30, 2023, provisional application No. 63/502,493, filed on May 16, 2023, provisional application No. 63/502,484, filed on May 16, 2023.

(51) Int. Cl.

*B25F 5/00* (2006.01)
*B25F 3/00* (2006.01)

(52) U.S. Cl.

CPC .............. *B25F 5/008* (2013.01); *B25F 5/006* (2013.01); *B25F 3/00* (2013.01)

(58) Field of Classification Search

CPC .. B25F 3/00; B25F 5/006; B25F 5/008; B24B 23/02; B24B 23/028

See application file for complete search history.

(56) References Cited

U.S. PATENT DOCUMENTS 2,079,143 A * 5/1937 Albertson .............. B25F 5/008 D8/62
2,123,222 A 7/1938 Albertson
2,367,668 A 1/1945 Champayne (Continued)

FOREIGN PATENT DOCUMENTS

CN 102510162 B 7/2014
CN 208163554 U * 11/2018

(Continued)

OTHER PUBLICATIONS

GB Patents Act 1977: Search Report under Section 17 dated Aug. 29, 2024 in related GB Application No. GB2406357.0, 1 page.

(Continued)

*Primary Examiner* — Shelley M Self
*Assistant Examiner* — David G Shutty
(74) *Attorney, Agent, or Firm* — Harness, Dickey & Pierce, P.L.C.

(57) ABSTRACT

An oscillating tool including a housing, a motor in the housing, a multitool shaft driven by the motor, and a clamp assembly operatively driven by the motor through the multitool shaft in an oscillating motion. The clamp assembly is configured to selectively hold a power tool accessory and a fan on the multitool shaft. The fan is operatively driven by the motor with the multi-tool shaft and the fan is a double side blade fan.

19 Claims, 23 Drawing Sheets

(56) References Cited

U.S. PATENT DOCUMENTS

| | | | | |
|---|---|---|---|---|
| 2,751,725 | A | 6/1956 | Champayne | |
| 2,830,411 | A | 4/1958 | Hartmann | |
| 3,226,580 | A | 12/1965 | Karl-Heinz et al. | |
| 3,496,680 | A | 2/1970 | Hutchins | |
| 3,857,206 | A | 12/1974 | Heffran | |
| 4,381,628 | A | 5/1983 | Dicke | |
| 4,961,016 | A | 10/1990 | Peng et al. | |
| 5,458,533 | A | 10/1995 | Barth et al. | |
| 5,768,933 | A | 6/1998 | Tanner et al. | |
| 5,888,128 | A | 3/1999 | Lamprecht et al. | |
| 6,244,943 | B1 * | 6/2001 | Bohler | B24B 23/02 72/359 |
| 6,277,013 | B1 * | 8/2001 | Sasaki | B24B 23/02 451/344 |
| 6,927,511 | B2 | 8/2005 | Cleanthous et al. | |
| 6,962,523 | B2 * | 11/2005 | Fraser | B24B 23/026 451/259 |
| 6,971,456 | B2 | 12/2005 | Yamada et al. | |
| 7,252,581 | B2 * | 8/2007 | Numata | B25F 5/02 15/230.1 |
| 7,258,173 | B2 * | 8/2007 | Hammerstingl | B25D 17/20 173/171 |
| 7,537,065 | B2 | 5/2009 | Gallagher et al. | |
| 8,087,977 | B2 * | 1/2012 | Gallagher | B24B 55/102 451/359 |
| 8,794,196 | B2 | 8/2014 | Shimokawa et al. | |
| 9,102,048 | B2 | 8/2015 | Kuehne et al. | |
| 9,168,650 | B2 | 10/2015 | Itakura et al. | |
| 9,545,712 | B2 | 1/2017 | Kuehne et al. | |
| 9,561,569 | B2 | 2/2017 | Rubens et al. | |
| 10,173,311 | B2 * | 1/2019 | Takeda | B24B 23/02 |
| 10,213,852 | B2 | 2/2019 | Qian et al. | |
| 10,661,427 | B2 * | 5/2020 | Matsushita | B25F 5/008 |
| 10,821,530 | B2 | 11/2020 | Qian et al. | |
| 10,836,027 | B2 | 11/2020 | Yang et al. | |
| 10,913,142 | B2 | 2/2021 | Takeda | |
| 10,982,740 | B2 | 4/2021 | Bek et al. | |
| 11,045,938 | B2 | 6/2021 | Iwakami et al. | |
| 11,045,939 | B2 | 6/2021 | Kotsuji et al. | |
| 11,554,476 | B2 | 1/2023 | Ejiri et al. | |
| RE49,414 | E | 2/2023 | Matsushita et al. | |
| 11,590,593 | B2 | 2/2023 | Aoki | |
| 2005/0153636 | A1 * | 7/2005 | Numata | B25F 5/008 451/358 |
| 2009/0000128 | A1 * | 1/2009 | Kaiser | B25F 5/008 30/166.3 |
| 2012/0247799 | A1 | 10/2012 | Hirabayashi et al. | |
| 2014/0287857 | A1 * | 9/2014 | Doering | F02M 35/1017 474/93 |
| 2015/0258673 | A1 | 9/2015 | Kuehne et al. | |
| 2016/0193727 | A1 | 7/2016 | Takeda | |
| 2017/0100831 | A1 | 4/2017 | Schreiber et al. | |
| 2017/0239802 | A1 | 8/2017 | Aoki | |
| 2018/0131058 | A1 | 5/2018 | Wang et al. | |
| 2019/0358769 | A1 | 11/2019 | Miyazawa et al. | |
| 2021/0154822 | A1 | 5/2021 | Takeda | |
| 2021/0162525 | A1 | 6/2021 | Aoki | |
| 2021/0260745 | A1 | 8/2021 | Miyazawa et al. | |
| 2021/0299839 | A1 | 9/2021 | Furusawa et al. | |
| 2022/0184793 | A1 | 6/2022 | Aoki | |
| 2022/0379452 | A1 | 12/2022 | Nakane et al. | |
| 2022/0388106 | A1 | 12/2022 | Yoshikane et al. | |
| 2022/0389934 | A1 | 12/2022 | Pawlowski et al. | |

FOREIGN PATENT DOCUMENTS

| | | | | |
|---|---|---|---|---|
| CN | 109571204 | A | 4/2019 | |
| CN | 110340780 | A | 10/2019 | |
| DE | 1729542 | U | 9/1956 | |
| DE | 6600430 | U | 1/1969 | |
| DE | 2025208 | A1 | 12/1971 | |
| DE | 2910845 | A1 | 10/1980 | |
| DE | 202013105712 | U1 | 3/2014 | |
| DE | 102015111717 | A1 | 1/2017 | |
| DE | 202018106210 | U1 | 11/2018 | |
| DE | 102017209160 | A1 | 12/2018 | |
| EP | 1345309 | A2 | 9/2003 | |
| EP | 1842625 | B1 | 5/2010 | |
| EP | 4852436 | A2 | 4/2012 | |
| EP | 4852436 | A3 | 4/2013 | |
| EP | 3501365 | A1 | 6/2019 | |
| EP | 3772593 | A1 | 2/2021 | |
| GB | 2282489 | B | 4/1997 | |
| JP | 2001009757 | A | 1/2001 | |
| WO | 2001094073 | A1 | 12/2001 | |
| WO | WO-2009112099 | A1 * | 9/2009 | B23Q 11/0096 |
| WO | 20131311412 | A1 | 9/2013 | |
| WO | 2020064005 | A1 | 4/2020 | |
| WO | 2021115806 | A1 | 6/2021 | |
| WO | 2022105833 | A1 | 5/2022 | |
| WO | 2023019134 | A1 | 2/2023 | |

OTHER PUBLICATIONS

EP Search Report dated Oct. 10, 2024 in related EP Application No. 24174528.0 , 9 pages.

* cited by examiner

OSCILLATING TOOL

CROSS-REFERENCE TO RELATED APPLICATIONS

This application claims benefit of Provisional Patent Application No. 63/504,843 filed May 30, 2023, and claims benefit of Provisional Patent Application No. 63/505,510 filed Jun. 1, 2023, and claims benefit of Provisional Patent Application No. 63/505,516 filed Jun. 1, 2023. This application is a continuation of and claims the benefit of U.S. Non-Provisional application Ser. No. 18/631,175 filed Apr. 10, 2024, which claims benefit of Provisional Patent Application No. 63/504,843 filed May 30, 2023, and claims benefit of Provisional Patent Application No. 63/505,510 filed Jun. 1, 2023, and claims benefit of Provisional Patent Application No. 63/505,516 filed Jun. 1, 2023, and claims benefit of Provisional Patent Application No. 63/502,484 filed May 16, 2023, and claims benefit of Provisional Patent Application No. 63/502,493 filed May 16, 2023. The entire contents of each are incorporated herein by reference.

BACKGROUND

The present disclosure relates to power tools including oscillating tools.

SUMMARY

Aspects of the present disclosure relate to example embodiments of a power tool, for example, an oscillating power tool.

According to an aspect, an example embodiment of an oscillating tool, includes: a housing; a motor in the housing; a multitool shaft driven by the motor; a clamp assembly operatively driven by the motor through the multitool shaft in an oscillating motion, the clamp assembly configured to selectively hold a power tool accessory; a fan on the multitool shaft; wherein the fan is operatively driven by the motor with the multi-tool shaft; and wherein the fan is a double side blade fan.

The fan may include a fan hub.

The fan hub may be disposed around the multitool shaft.

The fan may include a fan body.

The fan body may extend outwardly from the fan hub.

The fan body may have a first side.

The fan body may have a second side, opposite the first side.

The first side of the fan body may face the motor.

The oscillating tool may further include a headbox and at least one bearing in the headbox.

The second side of the fan body may face the headbox.

The fan may further include first fan blades on the first side of the fan body and second fan blades on the second side of the fan body.

The first fan blades may be aligned with the second fan blades.

The first fan blades may comprise a plurality of straight first fan blades.

The second fan blades may comprise a plurality of straight second fan blades.

The fan may be configured to blow air radially outwardly.

The housing may include at least one outlet vent and at least one inlet vent.

The at least one outlet vent may be disposed adjacent to the fan.

The oscillating tool of claim may further comprise a headbox and at least one bearing disposed in the headbox. The at least one inlet vent may comprise at least one forward inlet vent, wherein the at least one forward inlet vent is adjacent to the headbox.

The at least one inlet vent may comprise at least one rear inlet vent.

The at least one rear inlet vent may be adjacent to a foot of the oscillating tool.

The oscillating tool may further include a module in the housing.

The at least one rear inlet vent may be adjacent to the module.

The module may include a controller.

The at least one inlet vent may include at least one mid-housing inlet vent.

The at least one mid-housing inlet vent may be adjacent to a trigger.

The oscillating tool may further include a fork in the headbox.

According to an aspect, an example embodiment may be oscillating tool including: a housing; a motor in the housing; a multitool shaft driven by the motor; a clamp assembly operatively driven by the motor through the multitool shaft in an oscillating motion, the clamp assembly configured to selectively hold a power tool accessory; a fan on the multitool shaft. The fan may be operatively driven by the motor with the multi-tool shaft. The fan may include a fan body having a first side and a second side opposite the first side. The fan may further include first fan blades on the first side of the fan body and second fan blades on the second side of the fan body.

The first side of the fan body may face the motor.

The oscillating tool may further include a headbox comprising a metal material.

The second side of the fan body may face the headbox.

The housing may include at least one outlet vent and at least one inlet vent.

The at least one inlet vent may include at least one forward inlet vent.

The at least one forward inlet vent may be adjacent to the headbox.

The at least one inlet vent may include at least one rear inlet vent.

The at least one rear inlet vent may be adjacent to a foot of the oscillating tool.

The oscillating tool may further include a module in the housing.

The at least one rear inlet vent may be adjacent to the module.

The module may include a controller.

The at least one inlet vent may include at least one mid-housing inlet vent.

The at least one mid-housing inlet vent may be adjacent to a trigger.

The fan may be configured to blow air out of the at least one outlet vent.

The at least one outlet vent may be adjacent to the fan.

The fan, the at least one outlet vent and the at least one inlet vent may be configured such that a maximum temperature of the motor is kept to an average temperature of less than 130 degrees Celsius when the oscillating tool is operated at a maximum speed in an ambient atmosphere of about 20 degrees Celsius for two continuous minutes of operation not under load without an accessory.

According to an aspect, an example embodiment of an oscillating tool includes: a housing; a motor in the housing;

a multitool shaft driven by the motor; a clamp assembly operatively driven by the motor through the multitool shaft in an oscillating motion, the clamp assembly configured to selectively hold a power tool accessory; a fan on the multitool shaft; a headbox in a forward end of the housing; wherein the fan is operatively driven by the motor with the multi-tool shaft; and wherein the fan comprises a fan hub disposed around the multitool shaft. The fan may include a fan body extending outwardly from the fan hub. The fan may include first fan blades on a first side of the fan body and second fan blades on a second side of the fan body opposite the first side of the fan body. The housing may include at least one air inlet vent and at least one air outlet vent. The fan may be configured to direct airflow out of the at least one air outlet vent. The at least one air inlet vent may include at least one air inlet vent disposed adjacent to the headbox. The at least one air inlet vent may include at least one air inlet vent disposed rearward of the motor.

According to an aspect, an example embodiment of an oscillating tool includes: a housing; a motor in the housing; a multitool shaft driven by the motor; an eccentric bearing on the multitool shaft and driven by the motor; a first dampener on the eccentric bearing; an oscillator engaged with the eccentric bearing; and an output shaft driven in an oscillating manner through the oscillator.

The oscillating tool may further comprise a clamp assembly on the output shaft, the clamp assembly configured to selectively hold an accessory.

The accessory may be an oscillating tool blade.

The oscillating tool may further comprise a second dampener.

The first dampener may include at least one of rubber, silicon or a plastic.

The eccentric bearing may be made of a first material.

The first dampener may be made of a second material.

The first material may be different than the second material.

The first material may include metal.

The second material may be a non-metallic material.

The second material may be softer than the first material.

The first dampener may have a thickness of at least 0.01 mm and equal or less than 10 mm.

The first dampener may have a thickness of at least 0.1 mm and equal or less than 10 mm.

The first dampener may have a thickness of at least 0.5 mm and equal to or less than 10 mm.

The first dampener may have a thickness of at least 1 mm and equal to or less than 10 mm.

The oscillator may be a fork.

The fork may include a first prong and a second prong opposite the first prong.

The eccentric bearing may be disposed between the first prong and the second prong.

According to an aspect, an exemplary embodiment of an oscillating tool includes: a housing; a motor in the housing; a shaft driven by the motor; an eccentric bearing on the shaft and rotatable by the motor; a dampener on the eccentric bearing; a fork engaged with the eccentric bearing; an output shaft driven in an oscillating manner through the fork; and a clamp on the output shaft, the clamp configured to hold a power tool accessory.

The dampener may include at least one of rubber, silicon or a plastic.

The eccentric bearing may be made of a first material.

The dampener may be made of a second material.

The first material may be different than the second material.

The first material may include metal.

The second material may be a non-metallic material.

The second material may be softer than the first material.

The first dampener may have a thickness of at least 0.01 mm and equal or less than 10 mm.

The first dampener may have a thickness of at least 0.1 mm and equal or less than 10 mm.

The first dampener may have a thickness of at least 0.5 mm and equal to or less than 10 mm.

The first dampener may have a thickness of at least 1 mm and equal to or less than 10 mm.

According to an aspect, an example embodiment of an oscillating tool includes a housing; a motor in the housing; a rotating shaft driven by the motor; an eccentric shaft driven by the rotating shaft; a fork driven in an oscillating motion through the eccentric shaft; wherein the eccentric shaft has a first end and a second end opposite the first end; a first bearing supporting a first end of the eccentric shaft; a second bearing supporting a second end of the eccentric shaft; an output shaft driven in an oscillating motion by the fork; and a clamp on the output shaft, the clamp configured to hold a power tool accessory.

The second bearing may directly contact an outer surface of the eccentric shaft.

The first end of the eccentric shaft may be supported by the first bearing through the rotating shaft.

The eccentric shaft may include an eccentric portion between the first end of the eccentric shaft and the second end of the eccentric shaft.

The eccentric portion may have a central axis that is offset from a rotational axis of the eccentric shaft.

The eccentric portion may include an integral portion of the eccentric shaft.

The eccentric portion may include an eccentric element on the eccentric shaft.

The first bearing may be held in the headbox.

The second bearing may be held in the headbox.

The second end of the eccentric shaft may be a forward end.

The second end of the eccentric shaft may be above a portion of the fork.

The oscillating tool may further include a bearing seat. The first bearing may be held in the bearing seat.

The oscillating tool may further include a fan between the motor and the bearing seat.

According to an aspect, an example embodiment of an oscillating tool, includes: a housing; a motor in the housing; a rotating shaft driven by the motor; an eccentric shaft driven by the rotating shaft, the eccentric shaft having a first end and a second end opposite the first end; a first bearing supporting a first end of the eccentric shaft; a second bearing supporting a second end of the eccentric shaft; an output shaft driven in an oscillating motion; and a clamp on the output shaft, the clamp configured to hold a power tool accessory. The eccentric shaft may include an eccentric portion between the first end of the eccentric shaft and the second end of the eccentric shaft.

The eccentric portion may have a central axis that is offset from a rotational axis of the eccentric shaft.

The second bearing may contact an outer surface of the eccentric shaft.

The first end of the eccentric shaft may be supported by the first bearing through the rotating shaft.

The oscillating tool may further include a fork engaged with the eccentric portion. The output shaft may be driven by the motor through the fork.

The eccentric portion may include an integral portion of the eccentric shaft.

The eccentric portion may include an eccentric element on the eccentric shaft.

The first bearing may be held in the headbox.

The second bearing may be held in the headbox.

The oscillating tool may further include a fork engaged with the eccentric portion. The output shaft may be driven by the motor through the fork. The second end of the eccentric shaft may be a forward end. The second end of the eccentric shaft may be above a portion of the fork.

The oscillating tool may further include a bearing seat.

The first bearing may be held in the bearing seat.

The oscillating tool may further include a fan between the motor and the bearing seat.

According to an aspect, an example embodiment of an oscillating tool, includes: a housing; a motor in the housing; a fan driven by the motor; a headbox; an output shaft driven by the motor, the output shaft configured to move in an oscillating motion; a clamp configured to hold an accessory, the clamp configured to be driven by the motor through the output shaft in an oscillating motion; at least one bearing supporting the output shaft; wherein the fan comprises a mixed flow fan.

The fan may be configured to pull air through the motor towards the fan.

The fan may be configured to push air forward.

The oscillating tool may further include a venturi inlet.

The fan may be configured to push air into the venturi inlet.

The oscillating tool may further include a baffle adjacent to the venturi inlet.

The fan may be configured to push air into the venturi inlet and the baffle.

The venturi inlet and the baffle may be part of the headbox.

The headbox may include a forward portion.

At least a portion of the output shaft may be in the forward portion of the headbox.

The venturi inlet, the baffle and the forward portion of the headbox may be formed together as an integral part.

The fan may be configured to push air over an upper portion of the forward portion of the headbox.

The fan may push air toward the forward portion of the headbox to cool the headbox.

The fan may be configured to push air out of the oscillating tool and towards a work area at which the accessory is performing work.

The housing may include an outlet directed towards the work area.

According to an aspect, an example embodiment of an oscillating tool includes: a housing; a motor in the housing; a fan driven by the motor; a headbox; an output shaft driven by the motor, the output shaft configured to move in an oscillating motion; a clamp configured to hold an accessory, the clamp configured to be driven by the motor through the output shaft in an oscillating motion; at least one bearing supporting the output shaft; wherein the at least one bearing is housed in the headbox; wherein the fan is configured to pull air forward through the motor and push air forward towards the headbox and cool the headbox.

The oscillating tool may further include a venturi inlet.

The fan may be configured to push air into the venturi inlet.

The oscillating tool may further include a baffle adjacent to the venturi inlet.

The fan may be configured to push air into the venturi inlet and the baffle.

The venturi inlet and the baffle are part of the headbox.

The headbox may include a forward portion.

At least a portion of the output shaft may be in the forward portion of the headbox.

The venturi inlet, the baffle and the forward portion of the headbox may be formed together as an integral part.

The fan may be configured to push air over an upper portion of the forward portion of the headbox.

The fan may push air toward the forward portion of the headbox to cool the headbox.

The fan may be configured to push air out of the oscillating tool and towards a work area at which the accessory is performing work.

The housing may include an outlet directed towards the work area.

According to an aspect, an example embodiment of an oscillating tool includes: a housing; a motor in the housing; a headbox; an output shaft driven by the motor, the output shaft configured to move in an oscillating motion and being at least partially housed in the headbox; a clamp configured to hold an accessory, the clamp configured to be driven by the motor through the output shaft in an oscillating motion; and a jointed shaft operatively between the motor and the output shaft.

The jointed shaft may include a first joint.

The first joint may be configured to provide for rotation about a first axis.

The first joint may be configured to provide for rotation about a second axis.

The second axis may be generally perpendicular to the first axis.

The jointed shaft may include a second joint.

The second joint may be configured to provide for rotation about a third axis.

The second joint may be configured to provide for rotation about a fourth axis.

The fourth axis may be generally perpendicular to the third axis.

The first joint may be a U-joint.

The second joint may be a U-joint.

The jointed shaft may include a first portion and a second portion. The second portion may be translatable relative to the first portion.

The first portion may include a first spline and groove portion.

The second portion may include a second spline and groove portion.

The first spline and groove portion may engage the second spline and groove portion.

The oscillating tool may further include at least one bearing supporting the output shaft. The at least one bearing may be housed in the headbox.

The oscillating tool may further include an eccentric. The eccentric may be driven by the motor through the jointed shaft.

The eccentric may be housed in the headbox.

At least a portion of the output shaft may be housed in the headbox.

The at least one bearing supporting the output shaft may include a first bearing and a second bearing. The first bearing and the second bearing may be housed in the headbox.

The oscillating tool may further comprise a fork.

The fork may be at least partially housed in the headbox.

The fork may be engaged with the eccentric.

The fork may be engaged with the output shaft.

The fork may convert rotational motion from the jointed shaft to an oscillating motion so that the output shaft and the clamp move in an oscillating motion.

According to an aspect, an example embodiment of an oscillating tool includes: a housing; a motor in the housing; a headbox; an output shaft driven by the motor, the output shaft configured to move in an oscillating motion and being at least partially housed in the headbox; a clamp configured to hold an accessory, the clamp configured to be driven by the motor through the output shaft in an oscillating motion; a jointed shaft operatively between the motor and the output shaft; wherein the jointed shaft comprises a first portion and a second portion; and wherein the second portion is translatable relative to the first portion.

The jointed shaft may include a first joint.

The first joint may be configured to provide for rotation about a first axis.

The jointed shaft may include a second joint.

The second joint may be configured to provide for rotation about a second axis.

The oscillating tool may further comprise a fork.

The fork may be at least partially housed in the headbox.

The fork may be engaged with the eccentric.

The fork may be engaged with the output shaft.

The fork may convert rotational motion from the jointed shaft to an oscillating motion so that the output shaft and the clamp move in an oscillating motion.

An oscillating tool accessory may be held in the clamp.

The oscillating tool accessory may be a cutting blade.

The oscillating tool accessory may be a sanding accessory

According to an aspect, an example embodiment of an oscillating tool includes: a housing; a motor in the housing; a headbox; an output shaft driven by the motor, the output shaft configured to move in an oscillating motion and being at least partially housed in the headbox; a clamp configured to hold an accessory, the clamp configured to be driven by the motor through the output shaft in an oscillating motion; a jointed shaft operatively between the motor and the output shaft; wherein the jointed shaft includes a first joint; wherein the first joint is configured to provide for rotation about a first axis; wherein the first joint is configured to provide for rotation about a second axis; wherein the jointed shaft comprises a second joint; wherein the second joint is configured to provide for rotation about a third axis; and wherein the second joint is configured to provide for rotation about a fourth axis.

The first joint may be a U-joint.

The second joint may be a U-Joint.

The output shaft may be supported by at least one bearing. The at least one bearing may be in the headbox.

The oscillating tool may further comprise a fork.

The fork may be at least partially housed in the headbox.

The fork may be engaged with the eccentric.

The fork may be engaged with the output shaft.

The fork may convert rotational motion from the jointed shaft to an oscillating motion so that the output shaft and the clamp move in an oscillating motion.

These and other aspects of various embodiments, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

Example embodiments of the present application are described with reference to and in conjunction with the accompanying drawings, in which.

DETAILED DESCRIPTION OF EXEMPLARY EMBODIMENTS

The drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

As used herein, the terminology "at least one of A, B and C" and "at least one of A, B and C" each mean any one of A, B or C or any combination of A, B and C. For example, at least one of A, B and C may include only A, only B, only C, A and B, A and C, B and C, or A, B and C.

Figure 1:
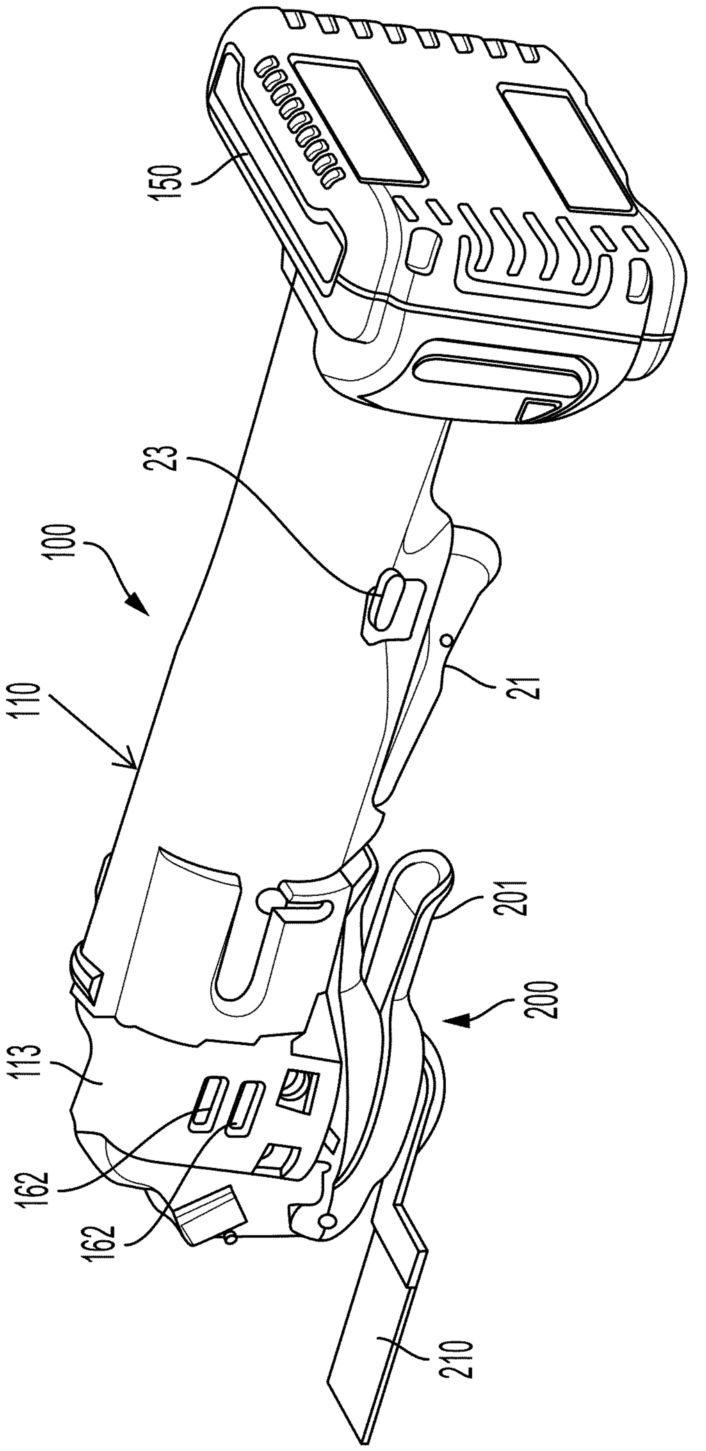
FIG. 1 is a perspective side view of an oscillating tool according to an exemplary embodiment.
Figure 2:
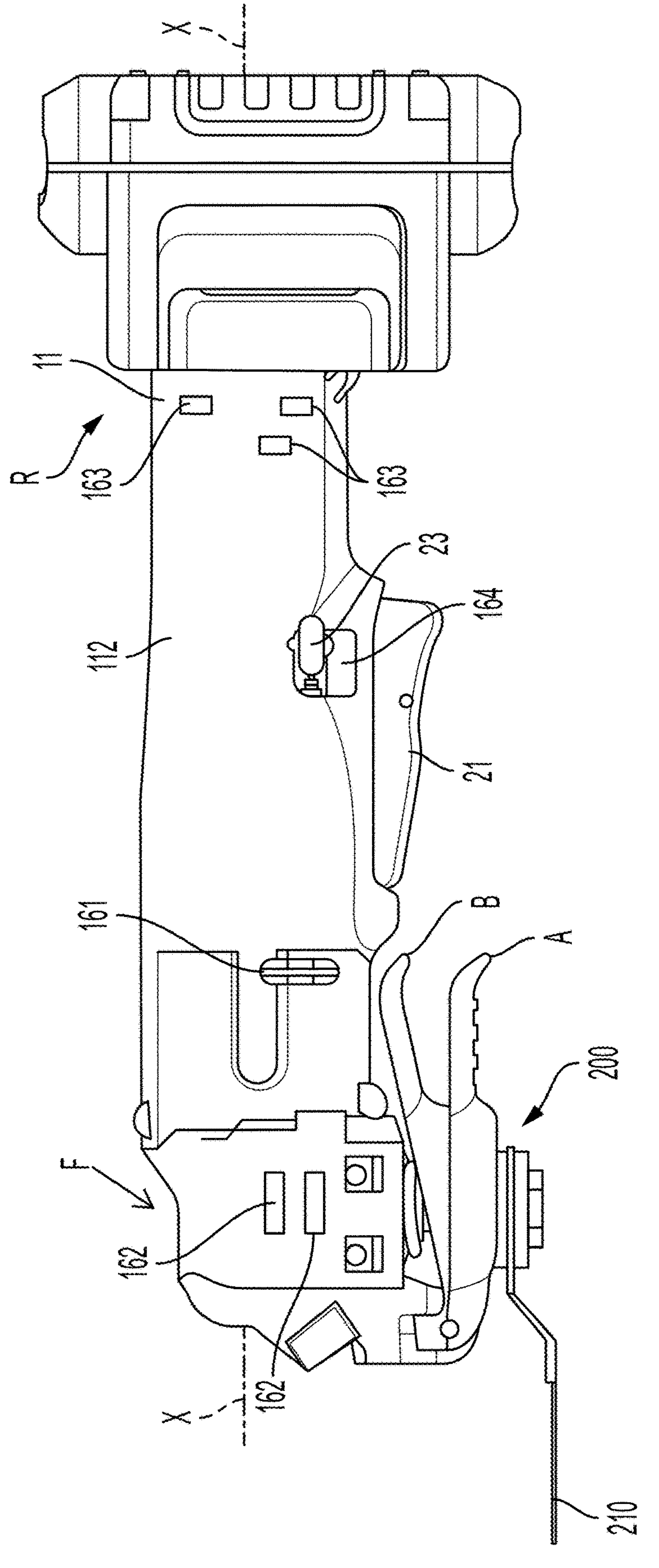
FIG. 2 is side view showing internal parts of the exemplary embodiment of the oscillating tool.
Figure 3:
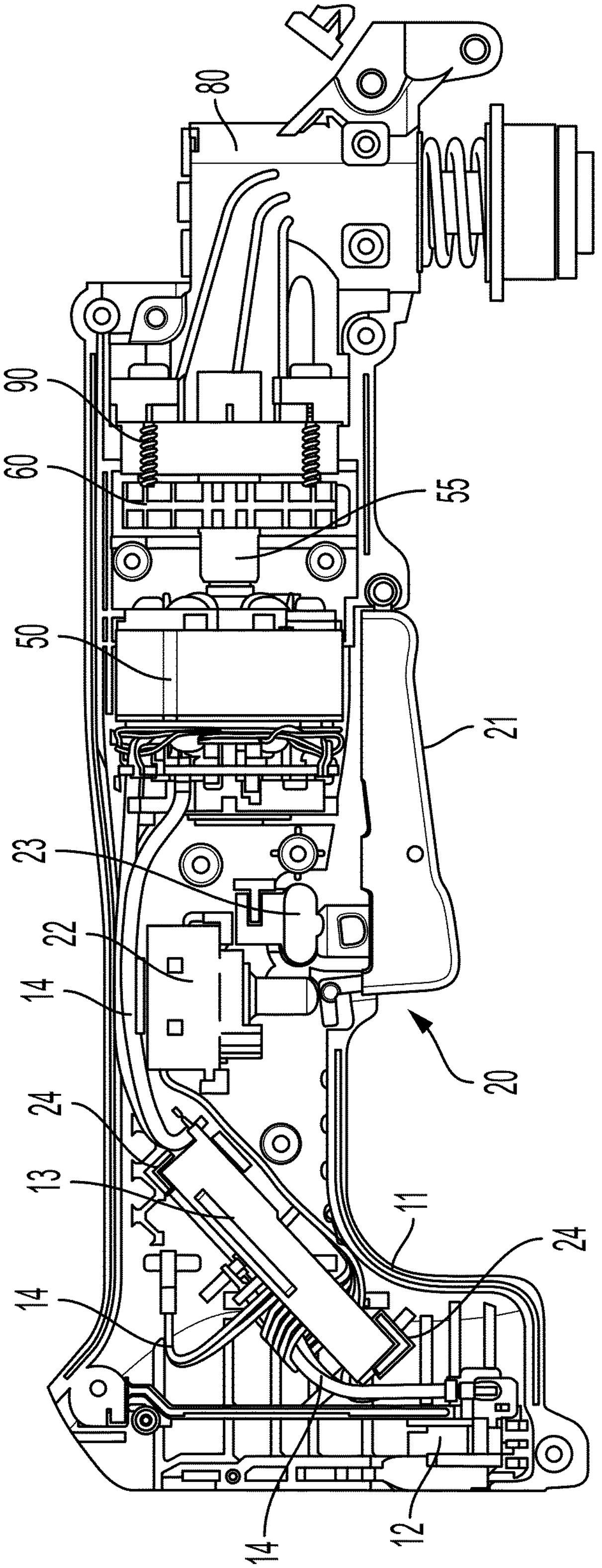
FIG. 3 is a perspective view of the exemplary embodiment of the oscillating tool.

FIGS. 1-3 illustrate an exemplary embodiment of an oscillating tool 100. As shown in FIG. 1, the oscillating tool 100 includes a housing 110. A rotatable trigger 21 is on the housing for turning the oscillating tool 100 on and off. At a rear of the tool 100, there is a battery foot 11. The battery foot 11 includes a battery pack receptacle configured to receive a power tool battery pack 150. The power tool battery pack 150 provides power for the oscillating tool 100 through the battery pack receptacle. The power tool battery pack 150 may be of the type shown in, for example, U.S. Pat. Nos. 7,598,705, 7,661,486, or U.S. Patent Application Publication No. 2018/0331335. U.S. Pat. Nos. 7,598,705, 7,661,486, and U.S. Patent Application Publication No. 2018/0331335 are hereby incorporated by reference.

The housing 110 includes a main body housing which includes a first housing shell 111 and a second housing shell 112. The housing 110 also includes a forward or headbox housing 113 at a front end of the oscillating tool 100.

As shown in FIGS. 1 and 2, the oscillating tool 100 includes a blade clamp assembly 200 configured to securely hold an oscillating tool accessory 210 such as an oscillating tool cutting blade (shown). A variety of oscillating tool accessories may be securely held by the blade clamp assembly 200. For example, the blade clamp assembly 200 may also securely hold a sanding attachment, a grout removing blade, a scraping blade or other oscillating tool accessory, and these various accessories may be alternatively held securely by the blade clamp assembly 200 for use.

The blade clamp assembly 200 is movable between an open position and a closed position. In the open position, the accessory 210 can be inserted into the clamp assembly 200 or removed from the clamp assembly 200. In the closed position the clamp assembly 200 clamps down on an accessory so that the accessory is firmly held in the clamp assembly 200 for cutting, sanding or the like. As shown in FIG. 2, the clamp assembly 200 includes a lever 201 movable between a first position A and a second position B so as to actuate the clamp assembly 200 and move the assembly from a closed or clamped position corresponding to lever position A and an open position corresponding to lever position B. When the oscillating tool 100 is activated, the clamp assembly 200 moves the accessory in an oscillating motion.

As shown in FIG. 2, the exemplary embodiment of the oscillating tool has a body with a longitudinal axis X. The blade clamp assembly 200 is at a front F of the oscillating tool 100 and the foot 11 is at a rear R of the oscillating tool 100.

FIG. 3 is a side view of the exemplary embodiment of the oscillating tool 100 with housing parts removed for illustrative purposes. As shown in FIG. 3, the oscillating tool 100 includes a battery pack receptacle 12 at the foot 11 of the oscillating tool 100. The battery pack receptacle 12 may include electrical connectors configured to provide an electrical connection to the battery pack 150. The battery pack receptacle 12 may also include one or more rails configured to guide the battery pack 150 into engagement with the electrical connectors. The battery pack receptacle 12 may include one or more vibration dampening members.

As shown in FIG. 3, the oscillating tool 100 may further include a module 13. The module 13 may be electrically connected to the battery pack receptacle 12 by, for example, wires. The wires 14 may provide a path for electric power from the battery pack 150. Data information may also be carried by the wires 14. The module 13 may include one or more printed circuit board and various components on the one or more printed circuit boards. For example, the module 13 may include a controller and the controller may include one or more programmable micro-processor or other programmable or non-programmable control integrated circuit. The components included in the module 13 may include one or more sensors. For example, the module 13 may include one or more current sensor, voltage sensor or temperature sensor. The controller included in the module 13 may include motor controls for controlling operation of a motor 50. The controller included in the module 13 may include one or more controls for a switch module 22 or the battery pack 150. As shown in FIG. 3, the module 13 of an example embodiment may be electrically connected to the switch module 22 and the motor 50 by wires 14. The wires 14 may allow electrical power and/or data connections between the various components.

As shown in FIG. 3, the module 13 is disposed at along an axis Y at an angle Z with respect to the longitudinal axis X of the oscillating tool 100. The angle Z may be between 10 and 80 degrees, between 20 and 70 degrees, between 30 and 60 degrees or between 35 and 55 degrees. The module 14 may be held in place by one or more housing ribs 24.

The oscillating tool includes a user-operable trigger switch 20. The trigger switch 20 includes the rotatable trigger 21 and the switch module 22. In the example embodiment the trigger 21 may be a separate component that actuates the separate switch module 22. In other embodiments, the trigger switch 20 may be one integrated part. The trigger switch 20 may provide variable speed control of the motor 50. In other embodiments, the trigger switch 20 may be configured to provide on and off control of the motor and a separate speed control may be provided. The separate speed control may include, for example, a user-operable dial that allows a user to set a speed of the motor 50 and therefore a speed of oscillation for the oscillating tool 100. The example embodiment may include a forward/reverse bar 23. The forward/reverse bar 23 may be set in a forward portion for forward operation; a reverse position for reverse operation or a locked-off position that prevents the trigger switch 20 from being activated. The locked-off position may include the forward/reverse bar 23 being located at a central position. The forward/reverse bar 23 may also be configured to allow the trigger switch 20 to be in a locked-on position in which the trigger switch 20 is secured in an activated position without the need for a user to continuously depress the trigger 21.

The motor 50 is disposed in the housing 110 of the oscillating tool 100 forward of the switch module 22. The motor 50 of the exemplary embodiment is a DC brushless motor. In some embodiments, the motor 50 may include positional sensors, such as Hall sensors, to assist with control of the brushless motor 50. In other embodiments, rotational positional information relating to the motor 50 rotor may be calculator or detected without any positional sensors, (what may be known in the art as sensorless brushless motor control). In other embodiments the motor may be a brushed motor, a universal motor or another type of motor.

The motor 50 of the example embodiment drives a multitool shaft 55. A double-sided blade fan 60 is disposed on the shaft 55 and rotates along with the shaft 55. The fan 60 is adjacent to a bearing seat 90. The bearing seat 90 is secured to a headbox 80. An oscillating fork is disposed in the headbox 80 and converts rotational movement of the shaft 55 into oscillating movement for the clamp assembly 200. One or more bearings may also be housed in the headbox 80. Additionally, an least a portion of an output spindle may be housed in the head box 80. In operation, the oscillating fork is connected to an output spindle and the output spindle is engaged with the clamp assembly 200. Rotational movement of the shaft 55 is converted into oscillating movement such that the output spindle oscillates back and forth and the clamp assembly 200 oscillates back and forth along with the output spindle. At least one bearing for the output spindle may be housed in the headbox 80.

The headbox 80 may be made of metal. The metal may include, for example, one or more of aluminum and steel.

Figure 4:
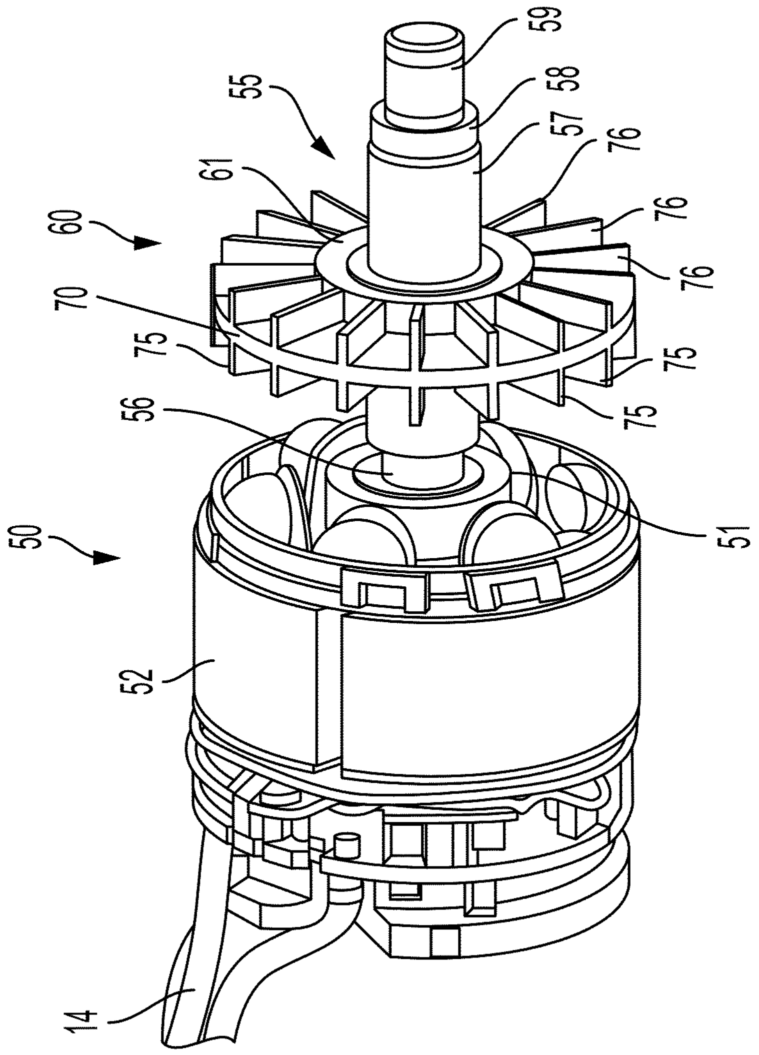
FIG. 4 is a perspective view of a motor and fan assembly of an exemplary embodiment.
Figure 5:
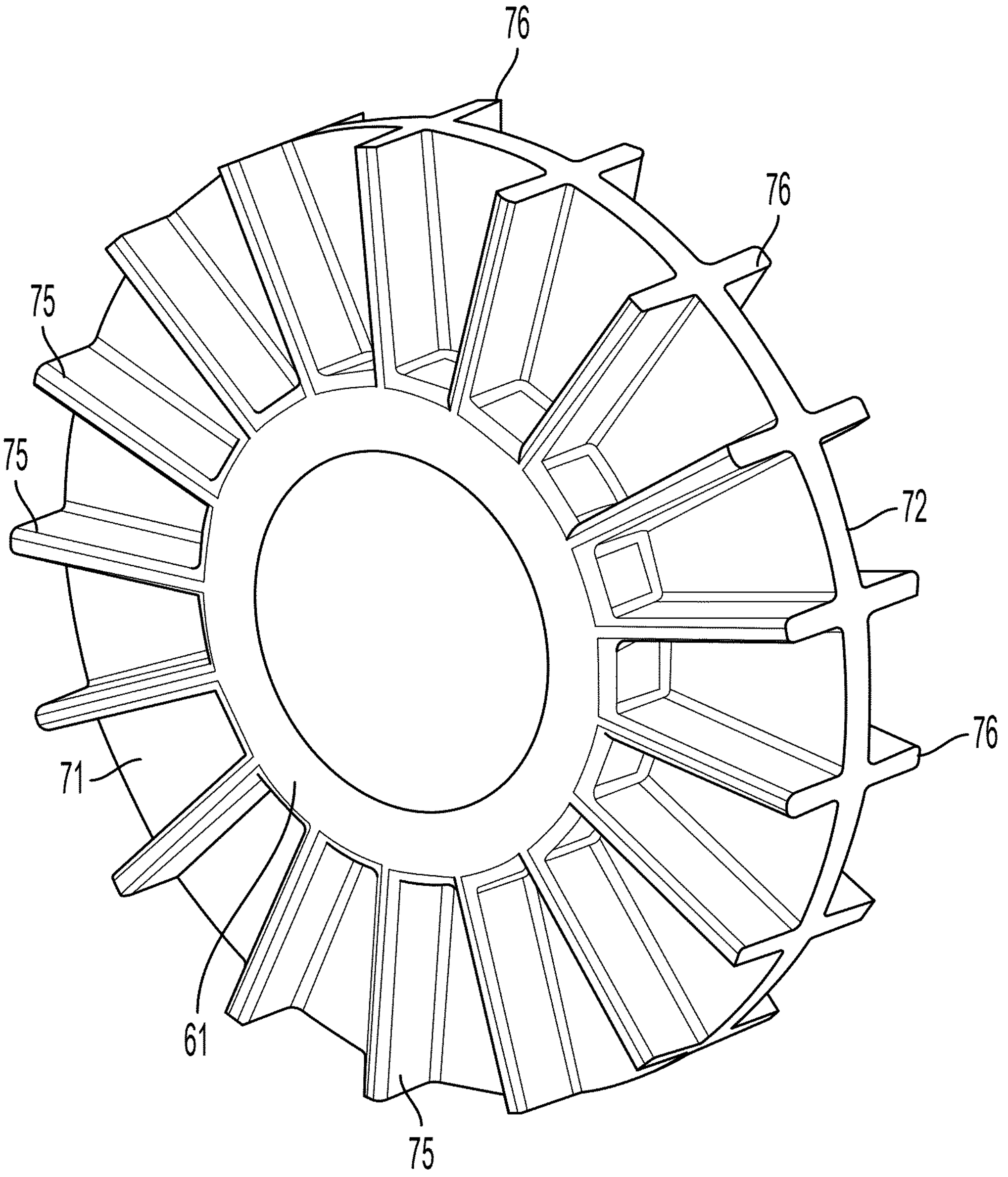
FIG. 5 is a perspective view of a fan of the exemplary embodiment.

The motor 50, multi-tool shaft 55 and fan 60 are shown in more detail in FIGS. 4 and 5. FIG. 4 is a perspective view of the motor 50, shaft 55 and a fan 60. FIG. 5 is a perspective view of the fan 60.

As shown in FIG. 4, the motor 50 includes a stator 52 and a rotor 51. The motor 50 is connected to wires 14. In the example embodiment, the wires 14 connect the motor 50 to the module 13. In other embodiments, wires may additionally or alternatively connect the motor 50 to the battery pack receptacle 12, the switch module 22 or another controller or module. As shown in FIG. 4, an multitool shaft 55 is connected to and driven by the motor 50. Accordingly, when the rotor 51 of the motor 50 rotates the multitool shaft 55 rotates along with the rotor 51 of the motor 50.

The multitool shaft 55 includes a generally cylindrical shape. A diameter of the shaft 55 may vary at different axial locations along the shaft. For example, as shown in FIG. 4, the multitool shaft 55 may have a stepped shape to include various portions of different diameter. For example, as shown in the example embodiment of FIG. 4, the multitool shaft may have a first portion 56 of a first diameter adjacent to the rotor 51, a second portion 57 with a second diameter adjacent to the first portion, a third portion 58 with a third diameter adjacent to the second portion 57 and a fourth portion 59 with a fourth diameter adjacent to the third portion 58. The fan 60 may be disposed on the second portion 57.

As shown, in the example embodiment of the multitool shaft 55, the second diameter may be greater than the first diameter. The third diameter may be smaller than the second diameter. The further diameter may be smaller than the third diameter.

The fan 60 may be press-fit onto the second portion 57 of the multitool shaft 55. There may be one or more positioning elements on the fan 60 or the multitool shaft 55 to position and/or secure the fan 60 on the multi-tool shaft 55. The fan 60 may be additionally or alternatively secured in place through an adhesive, welding or be a mechanical securing element.

In the example embodiment, the multitool shaft 55 is a one-piece rotor shaft that integrates the multitool shaft 55 with the rotor shaft. An integrated one-piece rotor shaft including a multitool shaft 55 may increase the stiffness of the multitool shaft 55 as compared to an example embodiment in which the multitool shaft is a separate piece pressed onto a rotor shaft. In other example embodiments, the multitool shaft may be a separate piece.

The multitool shaft 55 may be an eccentric shaft. For example, one or more of the first portion 56, the second portion 57, the third portion 58 and the fourth portion 59 may be offset from a rotational axis of the rotor 51. In one example embodiment, the first portion 56 has a non-eccentric rotational axis aligned with the rotational axis of the rotor 51 and the second portion 57 is eccentric such that a central axis of the second portion 57 is offset with respect to the rotational axis of the rotor 51. In another example embodiment, the first portion 56, the second portion 57, the third portion 58 and the fourth portion 59 are all eccentric relative to a rotational axis. In another example embodiment, the fourth portion 59 is eccentric relative to a rotational axis and one or more of the first portion 56, second portion 57 and third portion 58 are aligned with a central rotational axis an output of the motor 50 or the rotor 51 of the motor 50.

As shown in FIGS. 4 and 5, the fan 60 is a double-side blade fan. In the example embodiment, the fan 60 includes a central hub 61 with an opening 65 in the central hub 61. The shaft 55 projects through the central opening 65 as shown in FIG. 4. As additionally shown in FIG. 4, the central hub 61 surrounds the shaft 55 at the second portion 57 of the shaft 55.

The fan 60 has a body 70 extending from the central hub 61. As shown, the central hub 61 has a greater axial thickness than the body 70. That is, the central hub 61 is thicker than the body 70. The body 70 has a first side 71 facing the motor 50 including the rotor 51 and the stator 52. The body 70 also has a second side 72, opposite the first side 71. The fan 60 is a double-sided blade fan such that the fan 60 includes a plurality of first fan blades 75 on the first side 71 of the body 70 and also includes a plurality of second blades 76 on the second side 72 of the body 70. In the example embodiment shown in FIGS. 5 and 6, the first fan blades 75 are aligned with the second fan blades 76. In other embodiments, the first fan blades 75 and the second fan blades 76 may be staggered such that they are offset from one another.

In example embodiments, there may be at least three first fan blades; at least four first fan blades; at least five first fan blades; at least six first fan blades; at least eight first fan blades; at least ten first fan blades; at least twelve first fan blades or at least fourteen first fan blades. In example embodiments, there may be at least three second fan blades; at least four second fan blades; at least five second fan blades; at least six second fan blades; at least eight second fan blades; at least ten second fan blades; at least twelve second fan blades or at least fourteen second fan blades. In example embodiments, there may forty or fewer first fan blades, thirty or fewer first fan blades or twenty or fewer first fan blades. In example embodiments, there may forty or fewer second fan blades, thirty or fewer second fan blades or twenty or fewer second fan blades.

In the example embodiment, the first fan blades 75 and the second fan blades 76 are straight. That is, the first fan blades 75 and the second fan blades 76 project generally outwardly in a generally straight path. In other embodiments one or both of the first blades 75 and the second blades 76 may be curved. For example, the first blades 75 and the second blades 76 may be curved; the first blades 75 may be curved and the second blades 76 may be straight; or the first blades 75 may be straight and the second blades 76 may be curved. In other embodiments, the blades may be a mixture of straight and curved blades. For example, the first blades 75 may include all straight blades, all curved blades or a mixture of straight and curved blades. The second blades 76 may include all straight blades, all curved blades or a mixture of straight and curved blades.

In the example embodiment, the first blades 75 and the second blades 76 extend from an outer circumference of the hub 61 to an outer circumference of the body 70. In other embodiments, one or more of the first fan blades 75 and the second fan blades 76 may stop short of the outer circumference of the body 70 or may extend beyond the outer circumference of the body 70.

The double-sided blade fan 60 of the example embodiment helps to cool the oscillating tool 100 as will be explained in further detail with reference to FIGS. 6 and 7.

Figure 6:
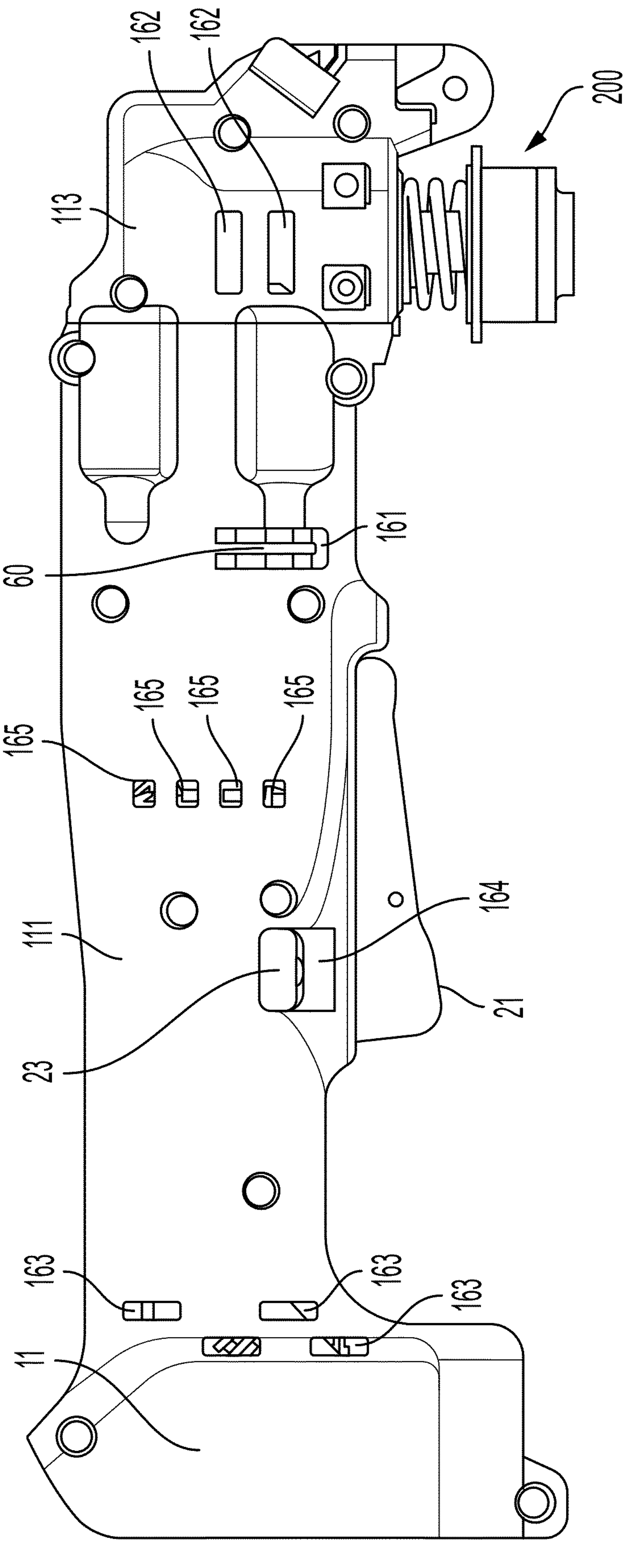
FIG. 6 is a side view of an exemplary embodiment.

As illustrated in FIG. 6, the oscillating tool 100 includes a plurality of inlet and outlet vents in the housing 110 configured to provide a cooling airflow. FIG. 6 illustrates a right side of the oscillating tool 100 and so housing shell part 111 and the left side of forward housing 113. In the example embodiment, the left side of the oscillating tool 100 includes corresponding inlet and outlet vents the same as or similar to those of the right side. For example, housing shell part 112 may have inlet and outlet vents corresponding to those on the housing shell part 111.

As shown in FIG. 6, housing shell part 111 includes outlet vents 161 aligned with the fan 60. Forward housing 113 includes inlet vents 162. The inlet vents 162 are generally adjacent to the headbox 80. In the example embodiment, housing shell part 111 includes rear inlet vents 163 adjacent to the foot 11 of the oscillating tool 100. Housing shell part 111 also includes inlet vents 164 around the forward and reverse bar 23. The housing shell part 111 may also include inlet vents 165 near a middle of the housing shell part 111. The inlet vents 165 may be adjacent to the motor 50. As discussed above, the housing shell part 112 may include similar inlet vents 163, 164 and 165. The forward or headbox housing 113 may include inlets 162 on the left side opposite those illustrated in FIG. 6.

In operation, the fan 60 rotates when it is driven by the motor 50. The fan 60 of the example embodiment is on the multitool shaft 55. Accordingly, the fan 60 rotates when the motor 50 is operated to drive the oscillating blade clamp assembly 200 and any accessory 210 held by the oscillating blade clamp assembly 200. When the fan 60 rotates, it drives air radially outwardly and out of the housing 110 through the outlet vents 161. Ambient air is drawn in through the inlet vents 162, 163, 164 and 165 and cools components such as the module 13, the switch module 22, motor 50, headbox 80 and components in the headbox 80. For example, in the example embodiment, ambient air is drawn in through inlet vents 163, flows around and past module 13, around and past the switch module 22, around and past motor 50 and through outlet 161. In the example embodiment, ambient air is also drawn in through inlet vents 164 and flows around and past motor 50 and through outlet 161. In the example embodiment, ambient air is also drawn in through inlet vents 162, flows around and past the headbox 80 and out through the outlet vents 161.

Figure 7:
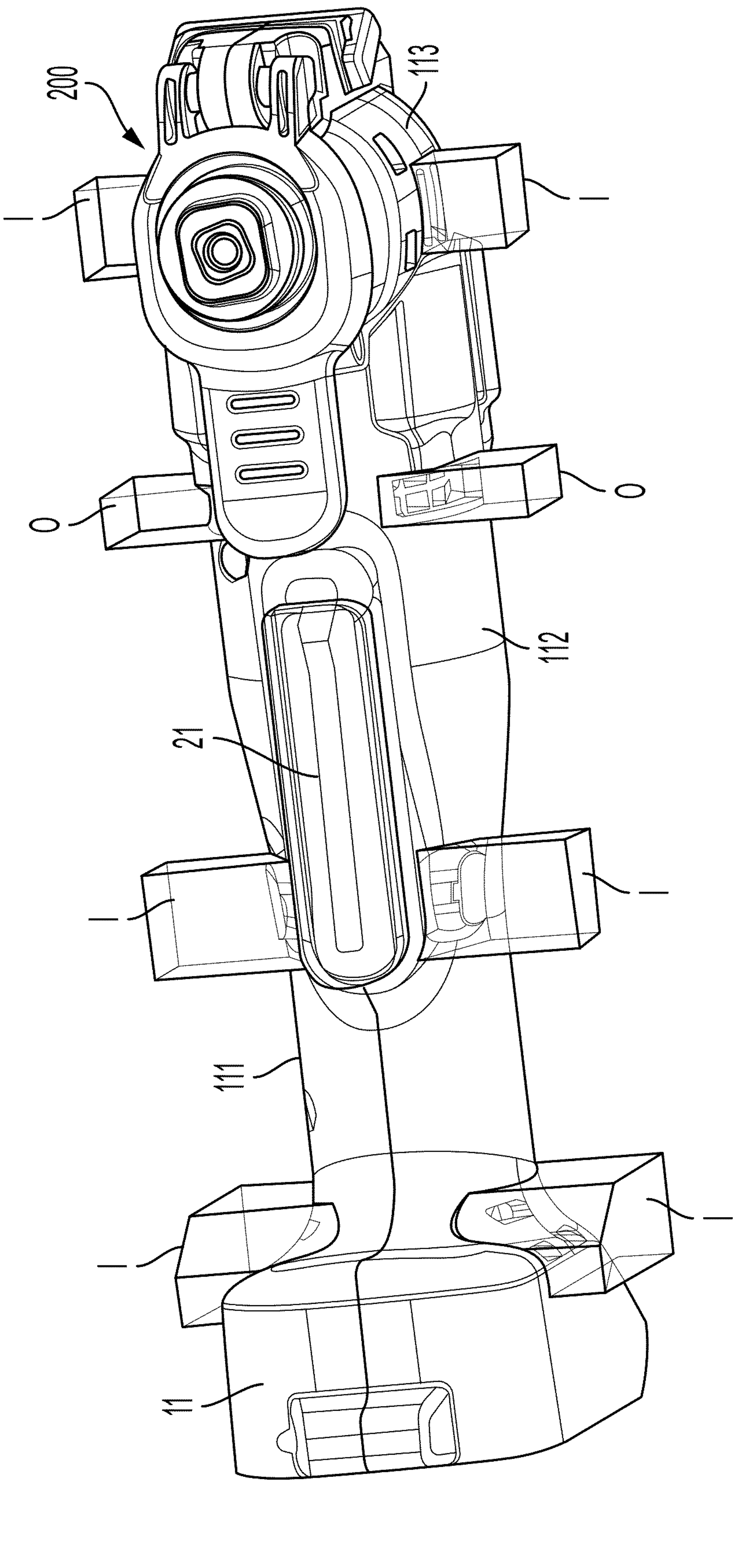
FIG. 7 is an exemplary illustrative perspective view of an exemplary embodiment.

FIG. 7 is an explanatory diagram illustrating the inlet areas I near the inlet vents and the outlet areas O near the outlet vents. The example embodiment of FIG. 7 does not include the inlet vents 165 shown in FIG. 6. Various example embodiments may include a greater or fewer number of inlet or outlet vents at varied positions and of various shapes and sizes.

Operation of the oscillating tool 100 may cause heating of the air in the oscillating tool 100, such as internal to the housing 110 of the oscillating tool 100. For example, operation of the motor 50 may produce heat. This may heat up air near the motor 50. Similarly, movement of parts in the headbox 80, such as movement of a fork or oscillation of an output shaft, may heat up air in the headbox 80. Excess heat may cause wear or failure of various components. For example, excess heat may cause excess wear of bearings, degradation of grease, degradation of magnets in the motor 50, degradation of wires or electrical components. This degradation may lead to decreased performance, decreased life or failure. Ambient air brought in the through the inlets vents 162, 163, 164 and 165 and forced out through outlet vents 161 cools the various components, ejects air of relatively higher temperature and introduces ambient air of relatively lower temperature. Accordingly, degradation and decreased performance may be avoided. For example, a temperature of a bearing in the headbox 80 may be kept to an average temperature of less than 150 degrees Celsius; less than 140 degrees Celsius; less than 130 degrees Celsius; or less than 120 degrees Celsius when the oscillating tool is used at room temperature (20 degrees Celsius) for two continuous minutes of operation at a maximum speed not under load without an accessory.

For example, a maximum temperature of the motor 50 may be kept to an average temperature of less than 150 degrees Celsius; less than 140 degrees Celsius; less than 130 degrees Celsius; less than 120 degrees Celsius; less than 110 degrees Celsius; less than 100 degrees Celsius; less than 90 degrees Celsius; less than 80 degrees Celsius; or less than 70 degrees Celsius; when the oscillating tool is used at room temperature (20 degrees Celsius) for two continuous minutes of operation at a maximum speed not under load without an accessory.

Figure 8:
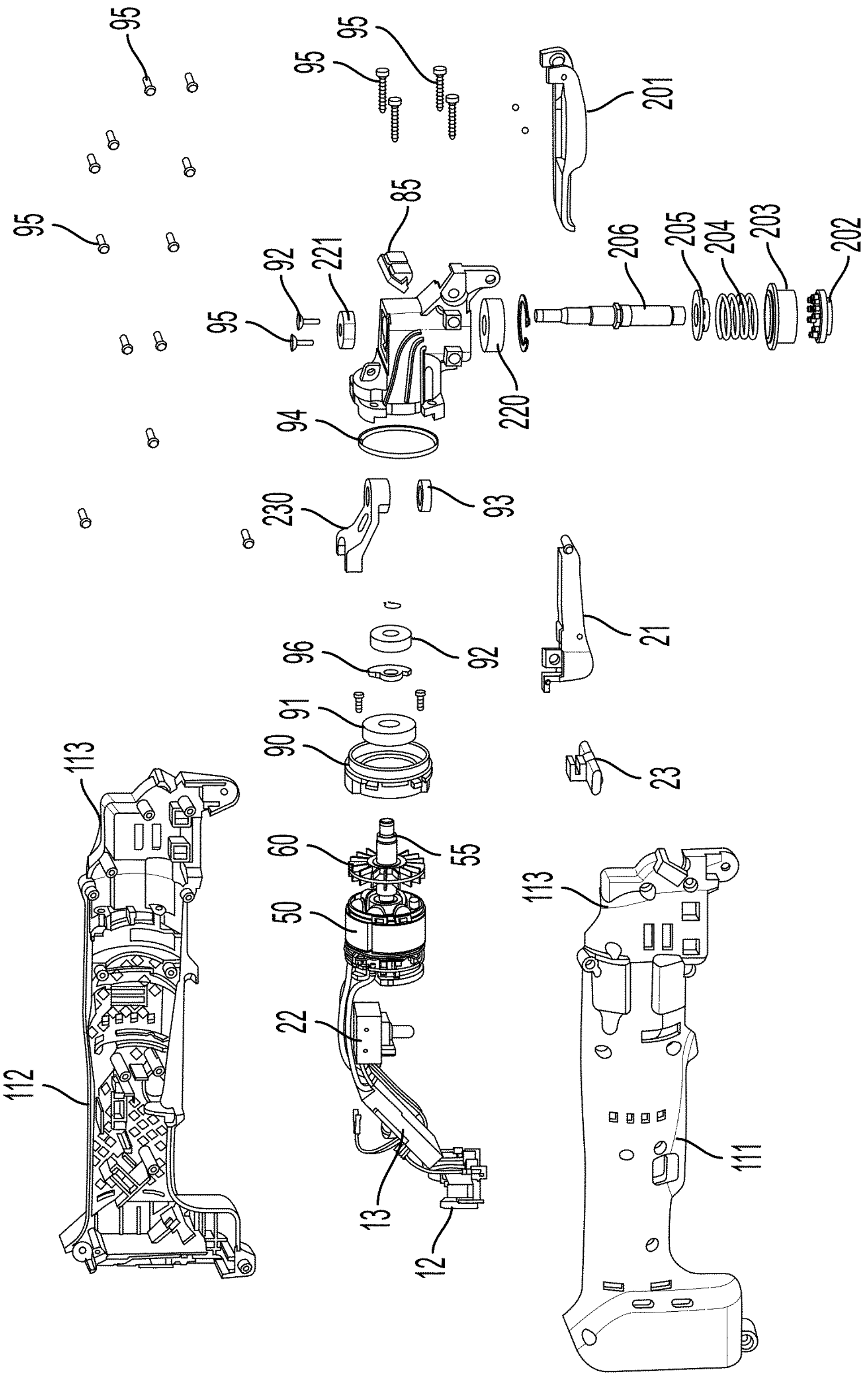
FIG. 8 is an exploded view of an exemplary embodiment.
Figure 9:
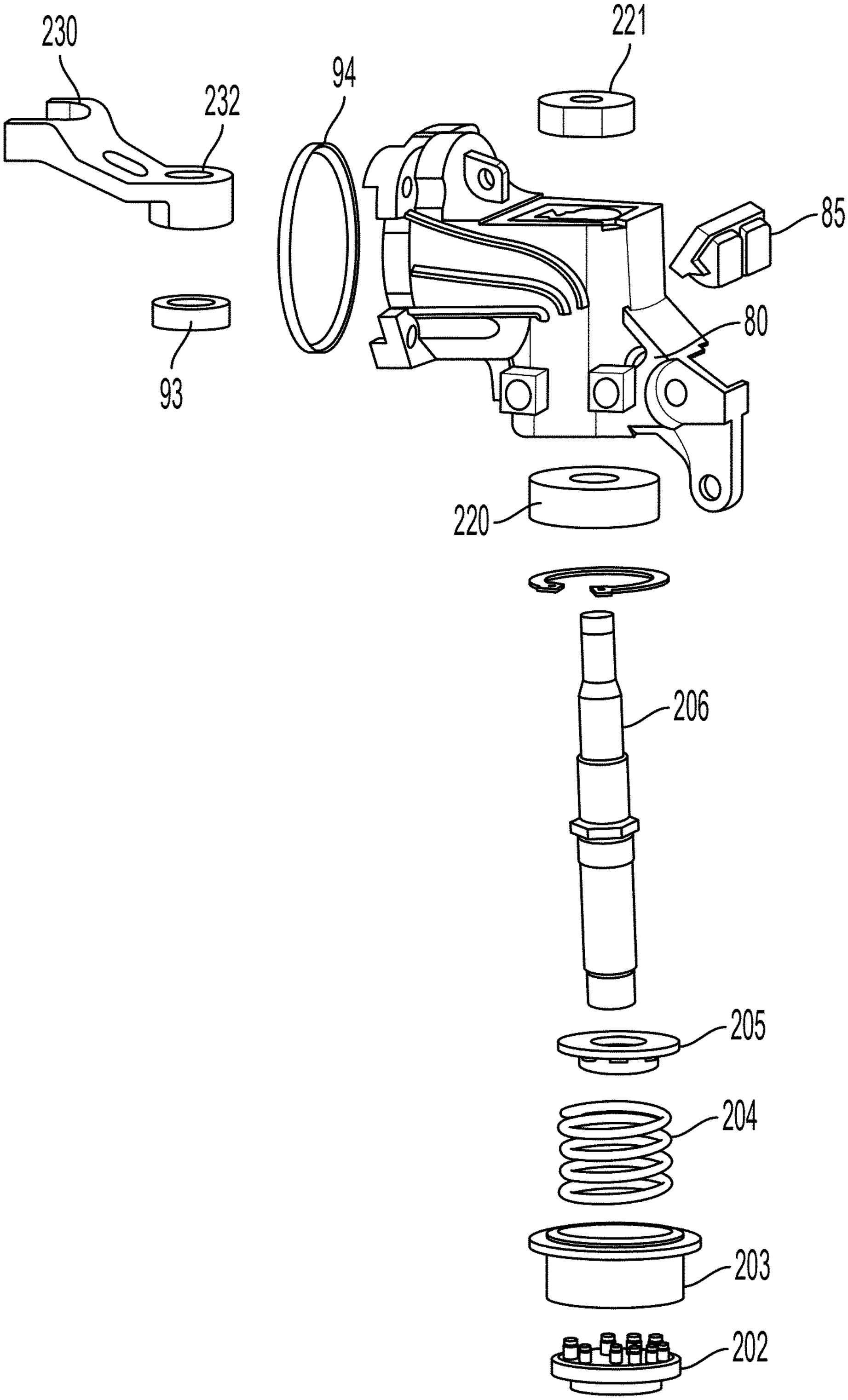
FIG. 9 is an exploded view of a portion of an exemplary embodiment.
Figure 10:
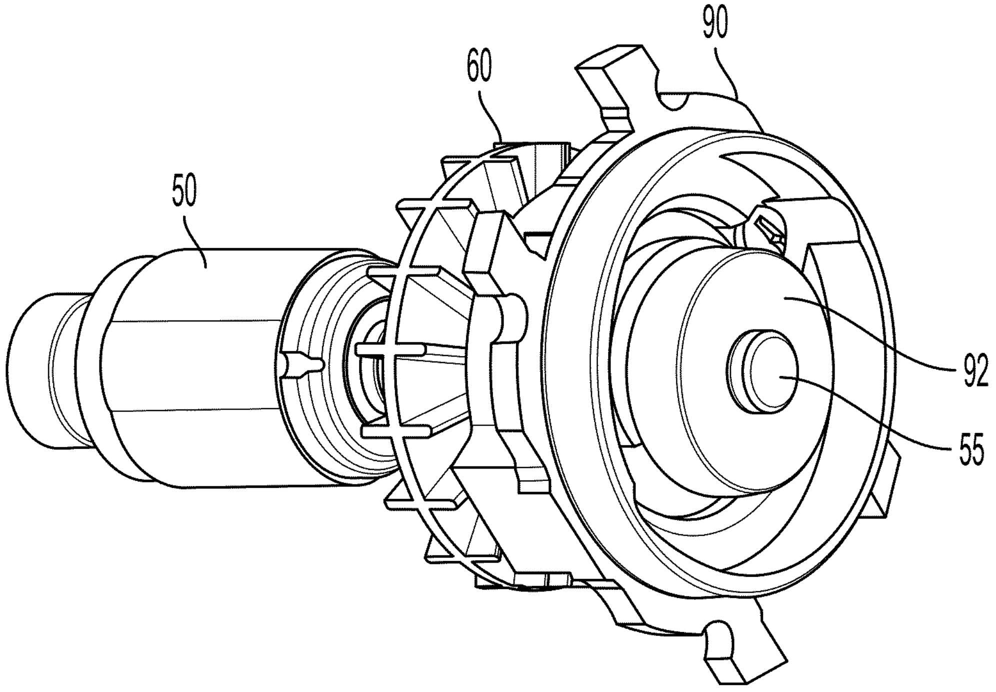
FIG. 10 is a perspective view of a portion of an exemplary embodiment.
Figure 11:
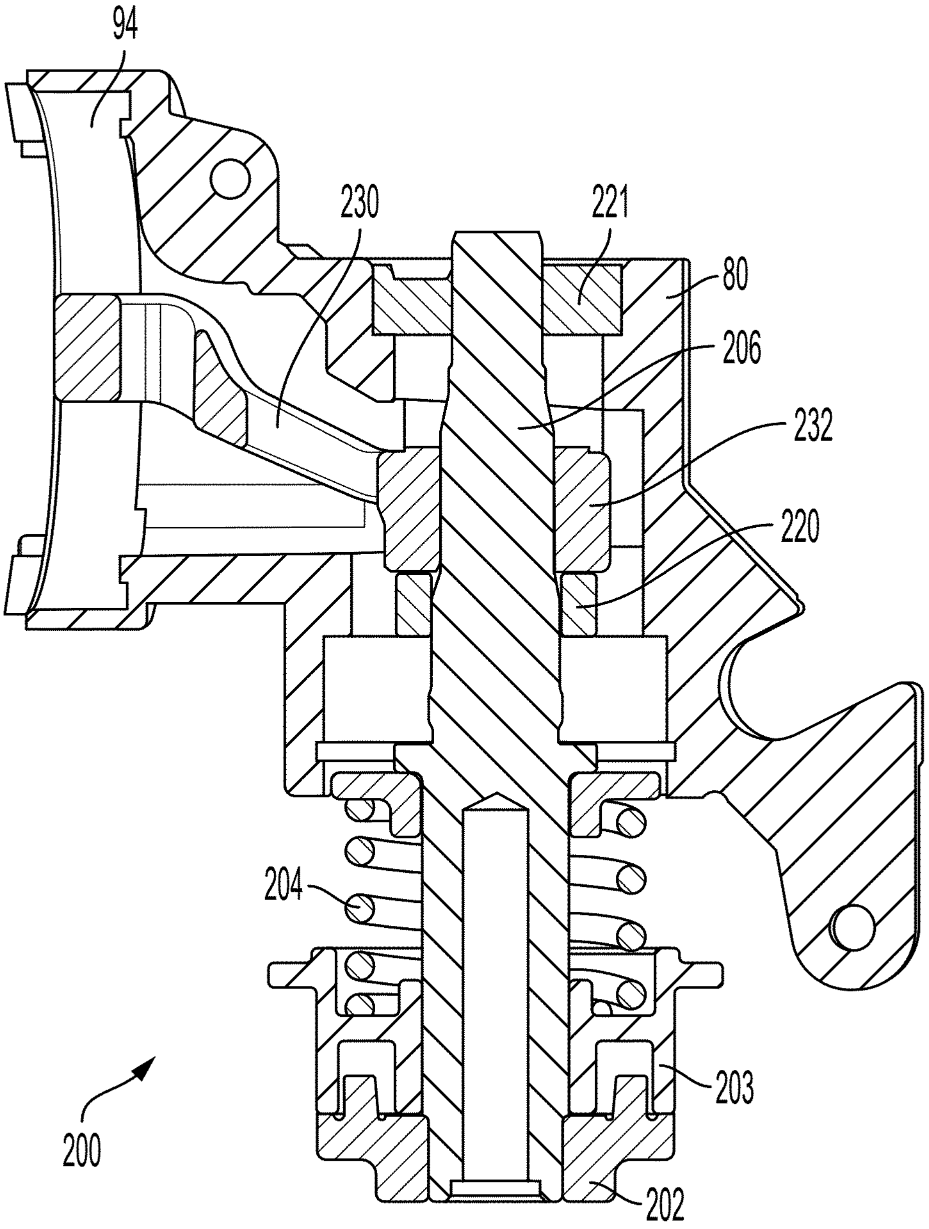
FIG. 11 is a cross-sectional side view of a portion of an exemplary embodiment.
Figure 12:
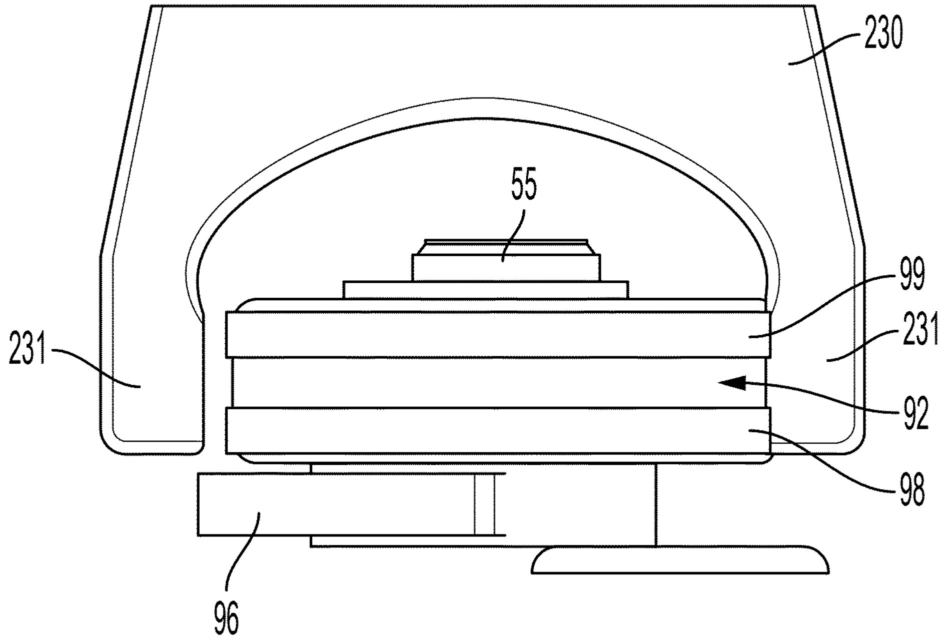
FIG. 12 is an illustration of a portion of an exemplary embodiment including an exemplary embodiment of a fork and eccentric bearing.
Figure 13:
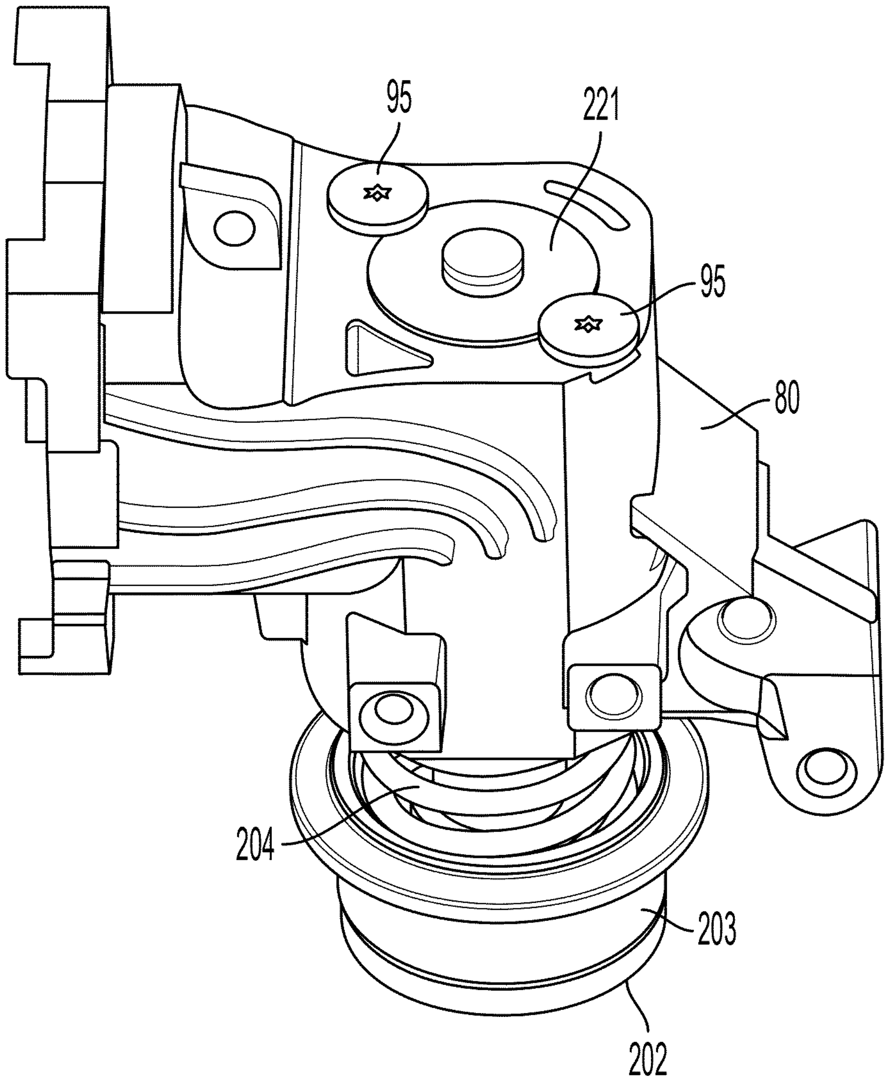
FIG. 13 is a perspective view of a portion of an exemplary embodiment.

FIGS. 8-11 illustrate various exploded views and assemblies of the oscillating tool 100. FIG. 8 is an exploded view of the oscillating tool 100. FIG. 9 is an exploded view of a portion of the oscillating tool located near a forward portion of the oscillating tool and including the headbox 80 region. FIG. 10 illustrates an assembly including components such as the motor 50, fan 60 and bearing seat 90. FIG. 11 is a cut-away side view of the portion of the oscillating tool located near the forward position of the oscillating tool and including the headbox 80 region. FIG. 12 is a close-up view of a portion of a fork 230 interacting with an eccentric bearing 92. The eccentric bearing 92 of the example embodiment is an eccentric bearing. In example embodiments, the eccentric may be another type of eccentric. For example, the eccentric may be an eccentric portion of a shaft. FIG. 13 is a perspective view of a portion of the oscillating tool located near a forward portion of the oscillating tool and including the headbox 80 region.

FIG. 8 is an exploded view of the oscillating tool 100 of an exemplary embodiment and FIG. 10 is an assembly including the motor 50 and fan 60. As shown in FIGS. 8 and 10, the fan 60 is forward of the motor 50. As shown in FIG. 10, a ball bearing 91 is assembled onto the multitool shaft 55. An eccentric wheel 96 is disposed on the multitool shaft 55 after the ball bearing 90. An eccentric ball bearing 92 is then assembled onto the multitool shaft 55. As shown in FIGS. 8 and 10, a bearing seat surrounds a portion of the multitool shaft 55.

FIG. 9 is an exploded view of components of a forward portion of the oscillating tool 100, FIG. 11 is a cut-away view of components of a forward portion of the oscillating tool 100, and FIG. 13 is a perspective view of a forward portion of the oscillating tool 100. As shown in FIGS. 9 and 11, the oscillating tool includes a fork 230. As shown in FIG. 12, the fork 230 has two prongs 231. Eccentric bearing 92 is on the multitool shaft after the eccentric wheel 96 and is driven by the motor 50. Eccentric bearing 92 is also engaged between the two prongs 231 of the fork 230. As the eccentric bearing 92 rotates, it engages the prongs 231 of the fork 230 to push the fork 230 back and forth. This creates an oscillating motion. As shown, the eccentric bearing 92 has a generally cylindrical shape with a central hole so that the eccentric bearing 92 fits onto the shaft 55. The eccentric bearing 92 is engaged onto the shaft 55 such that the eccentric bearing 92 rotates with the shaft 55. The eccentric bearing 92 may be engaged, for example, by one of more of a frictional fit, adhesives, soldering or fasteners.

As shown in FIG. 11, an engagement portion 232 of the fork 230 fits around and engages output shaft 206. The output shaft 206 is attached to the engagement portion 232 and oscillates along with the engagement portion 232. The output shaft 206 may be welded to the engagement portion 232, the engagement portion 232 may be engaged with a frictional and/or other mechanical fit with the output shaft 206. Accordingly, as the fork 230 oscillates, the engagement portion 232 oscillates, causing the output shaft 206 to oscillate. The clamp assembly 200 then oscillates along with the output shaft 206. As shown in FIGS. 8, 9 and 11, for example, the clamp assembly includes a bottom clamp 202 and a top clamp 203. The top clamp 203 is biased by a biasing member 204 towards the bottom clamp 202. The biasing member 204 may be or include a spring. The bottom clamp 202 of the exemplary embodiment includes protrusions for engaging with an accessory 210. In the example embodiment, the bottom clamp 202 is stationary and the top clamp 203 moves away from the bottom clamp 202 to open the clamp assembly 200. In other embodiments, the bottom clamp 202 may be movable and the top clamp 203 may be movable or stationary. Additionally, protrusions or other mating features may be included on the top or bottom clamp. Spring stopper 205 is at a top of the spring 204. The output spindle 206 is supported by bearings 220 and 221. Bearings 220 and 221 are in the headbox 80. Bearing 221 is at a top end of the output shaft 206. Bearing 220 is at a central region away from the top and bottom ends of the output shaft 206.

As shown in, for example, FIG. 9, the oscillating tool 100 may include a light 85. The light 85 may include one or more LEDs. The light may be electrically connected to the battery pack 150 via wires or other means in order to power the light 85.

As shown in FIG. 12, the exemplary embodiment may include one or more dampeners 98, 99 on the eccentric bearing 92 configured to reduce at least one of noise or vibration and/or increase durability or longevity of the eccentric bearing 92 or the fork 230. As discussed above, in example embodiments, the eccentric may be in other forms such as an eccentric portion of a shaft. The eccentric may be a separate component or integral with a shaft. The dampeners 98, 99 may be O-rings. The dampeners 98, 99 may include one or more of rubber or silicon. The eccentric bearing 92 may be made of a first material and the dampeners 98, 99 may be made of a second material, different than the first material. The first material may include metal. The second material may be softer than the first material. An outer surface of the dampeners 98, 99 may have a higher coefficient of friction than an outer surface of the eccentric bearing 92. The dampeners 98, 99 may have a thickness of at least 0.01 mms and extend at least 0.01 mm from an outer surface of the eccentric bearing 92 on which they are disposed. The dampeners 98, 99 may have a thickness of at least 0.01 mm and extend at least 0.01 mm from an outer surface of the eccentric bearing 92 on which they are disposed. The dampeners 98, 99 may have a thickness of at least 0.03 mm and extend at least 0.03 mm from an outer surface of the eccentric bearing 92 on which they are disposed. The dampeners 98, 99 may have a thickness of at least 0.05 mm and extend at least 0.05 mm from an outer surface of the eccentric bearing 92 on which they are disposed. The dampeners 98, 99 may have a thickness of at least 0.1 mm and extend at least 0.1 mm from an outer surface of the eccentric bearing 92 on which they are disposed. The dampeners 98, 99 may have a thickness of at least 0.15 mm and extend at least 0.15 mm from an outer surface of the eccentric bearing 92 on which they are disposed. The dampeners 98, 99 may have a thickness of at least 0.2 mm and extend at least 0.2 mm from an outer surface of the eccentric bearing 92 on which they are disposed.

As can be seen, since the dampeners 98, 99 are on an outside surface of the eccentric bearing 92, the dampeners 98, 99 at least partially contact the prongs 231 of the fork 230. Contact between an outer surface of the eccentric bearing 92 and the prongs 231 of the fork 230 is thus reduced or eliminated. Material of the dampeners 98, 99 may be chosen to reduce noise, vibration and wear.

In the example embodiment, there are two dampeners 98, 99 and the two dampeners 98 and 99 have the substantially the same construction. In other embodiments, there may be a greater or lesser number of dampeners. For example, there may be only a single dampener 98 or 99. There may be at least two dampeners, at least three dampeners, at least for dampeners or at least five dampeners. There may be five or fewer dampeners, four or fewer dampeners or three or fewer dampeners. The dampener 98 may be made of a different material than dampener 99, may be of a different size or shape than dampener 99. For example, dampener 98 may have a greater or lesser thickness than dampener 99.

The dampeners 98 and 99 are configured to reduce at least one of vibration and or noise as compared to an eccentric without the dampeners. Accordingly, an oscillating tool 100 of an example embodiment which includes one or more dampeners 98, 99 may have less noise generated by the interface of the eccentric bearing 92 and the fork 230. The oscillating tool 100 of the example embodiment including one or more of the dampeners 98, 99 may create less vibration as compared to an eccentric bearing 92 without such dampeners 98, 99. The decreased vibration may improve durability.

Figure 14:
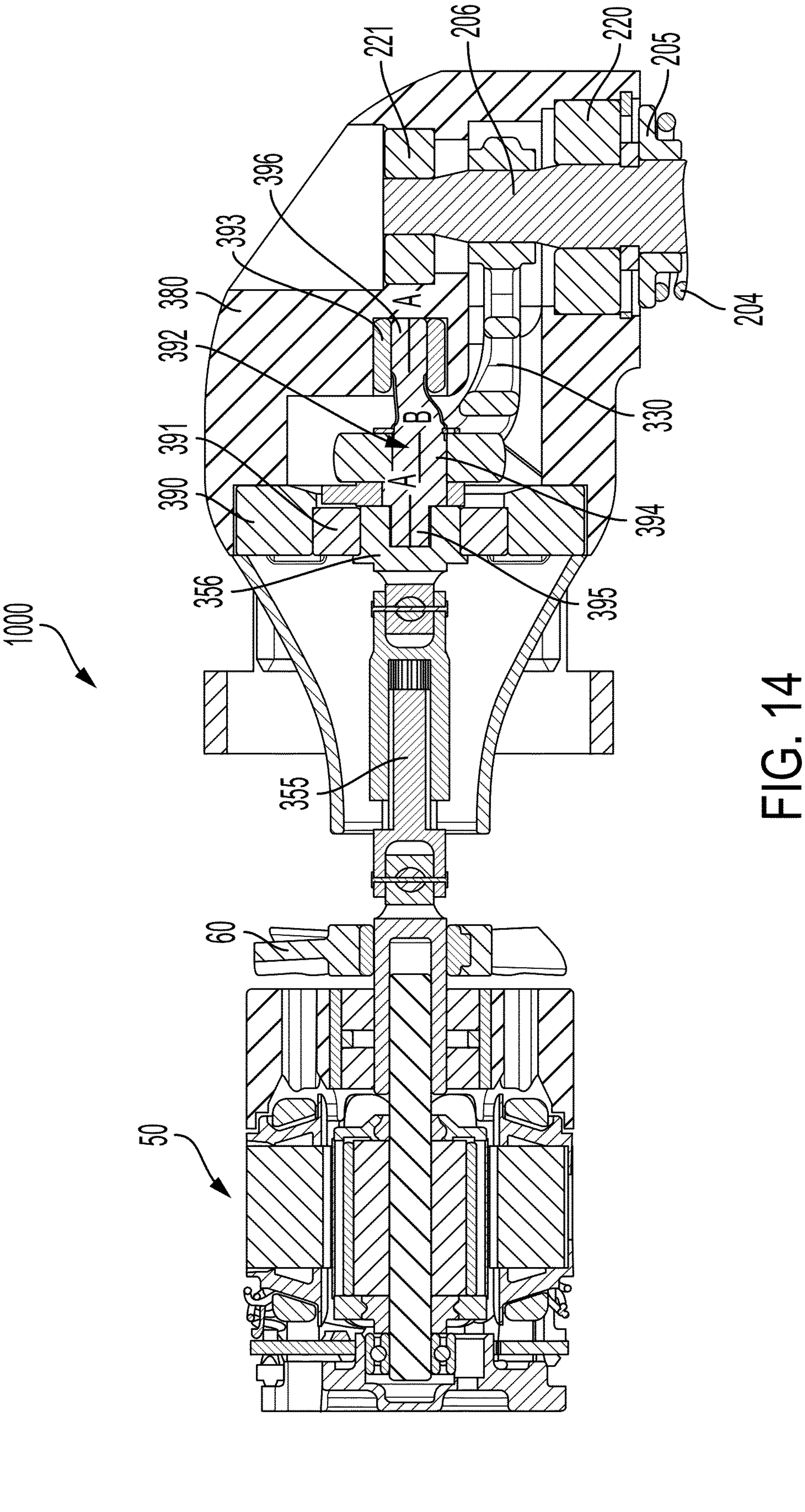
FIG. 14 is a cross-sectional side view of a portion of an exemplary embodiment of an oscillating tool.

FIGS. 13 and 14 illustrate an exemplary embodiment of an oscillating tool 1000 including another embodiment of an eccentric shaft. FIGS. 13 and 14 are cross-sectional illustrations of a portion of internals of the oscillating tool 1000. The oscillating tool 1000 may be the same as or similar to the oscillating tool 100, unless otherwise described. For example, the oscillating tool 1000 may be powered by a battery pack 150, include the housing parts 111, 112 and 113, include the trigger 21 and include the clamp assembly 200. Additionally, parts, features, elements or components of example embodiments of an oscillating tools throughout the description may be substituted for each other or combined with each other, as applicable. For example, features, components and aspects of oscillating tool 100 and 1000 may be substituted for each other or combined with each other, as applicable.

As shown in FIG. 14, the oscillating tool includes motor 50 with fan 60. The oscillating tool 1000 includes a connecting shaft 355, which may also be referred to as a rotating shaft or driving shaft, rotationally driven by the motor 50. The connecting shaft 355 drives an eccentric shaft 392. In particular, the connecting shaft 355 has a connecting portion 356 that engages a first end 395 of eccentric shaft 392. The connecting portion 356 and the first end 395 may included mechanical engaging parts. For example, as shown, the connecting portion 356 has portions outside of the first end 395. The connecting portion 356 may have additional features for connecting with the first or rear end 395 of the eccentric shaft 392. For example, the connecting portion 356 may include splines or grooves and the first end 395 may include grooves or splines that engage the splines or grooves of the connecting portion 356. In an embodiment, the connecting portion 356 may have a hexagonal recess shape and the rear end 395 of the eccentric shaft 392 may have a hexagonal shape that first into hexagonal recess shape.

Figure 15:
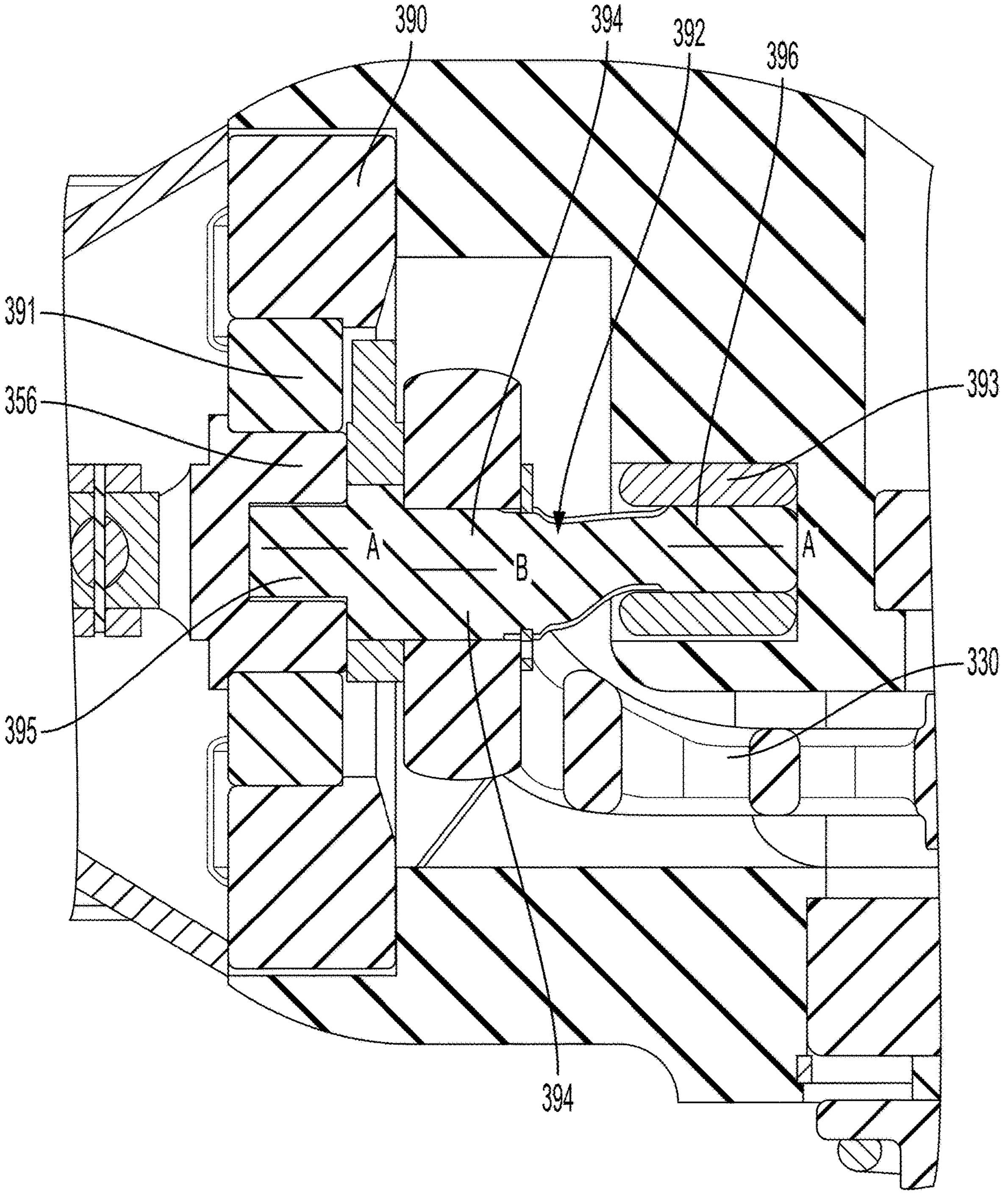
FIG. 15 is a cross-sectional side view of a portion of an exemplary embodiment of an oscillating tool.

As shown in FIGS. 14 and 15, the eccentric shaft 392 is supported at a first or rear end 395 by bearing 391 and at a second or front end 306 by a second bearing 393. The eccentric shaft 392 is rotatable.

As shown in FIG. 14, in the example embodiment, the connecting portion 356 and first end 395 are held in a first eccentric shaft bearing 391. The first bearing 391 is held in a bearing seat 390. The bearing seat contacts and is held in a headbox 380. In the example embodiment, the first eccentric shaft bearing 391 contacts an outer surface of the connecting portion 356 of the connecting shaft 355. In other embodiments, the eccentric shaft 392 may have an outer part around a connecting portion so as to contact bearing 391.

As shown in FIGS. 14 and 15, the eccentric shaft 392 includes a central rotational axis A and an eccentric axis B. The central rotational axis A is the axis about which the eccentric shaft 392 rotates. The eccentric axis B is an axis of an eccentric portion and is offset from the rotational axis A. As the eccentric shaft 392 rotates about the rotational axis A, the eccentric portion 394 of the eccentric shaft 392 with an eccentric axis B rotates as well. Since the axis B is eccentric, the eccentric portion 394 rotates off-center and contacts opposite prongs of the fork 330. The fork 330 operates in general the same as fork 230. However, the fork 330 has a somewhat more curved shape so as to travel under the bearing 393 and the front end 396 of the eccentric shaft 392. As the eccentric portion 394 contacts and pushes opposite prongs of the fork 330 to provide oscillating motion to the fork 330. The fork 330 is connected to an output shaft 206. The output shaft is connected to a clamp assembly 200. Accordingly, as the eccentric shaft 392 rotates, the clamp assembly 200 is driven in an oscillating motion.

The eccentric portion 394 may be an integral portion of the eccentric shaft 392. In embodiments, the eccentric portion 394 may include another component, such as a cylindrical component fit onto a shaft.

Figure 16:
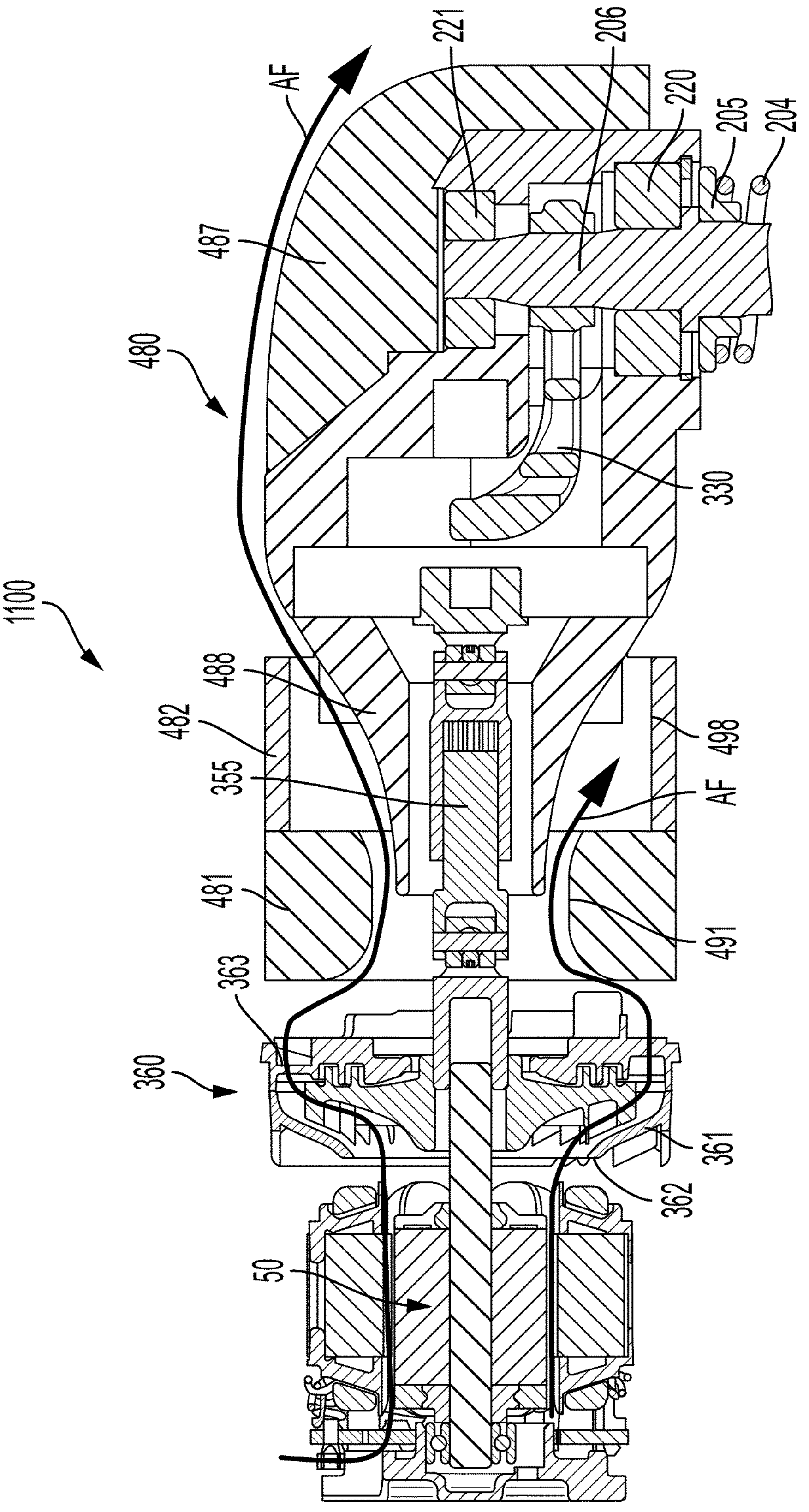
FIG. 16 is a cross-sectional side view of a portion of an exemplary embodiment of an oscillating tool.
Figure 17:
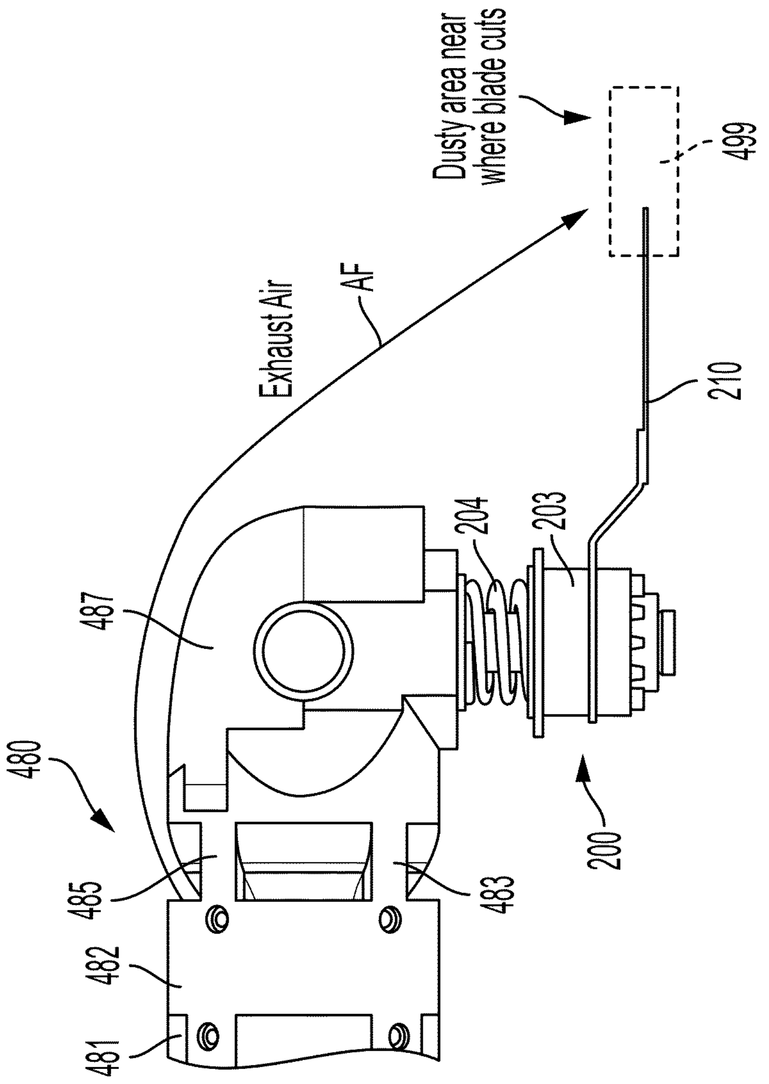
FIG. 17 is a side view of a portion of an exemplary embodiment of an oscillating tool.
Figure 18:
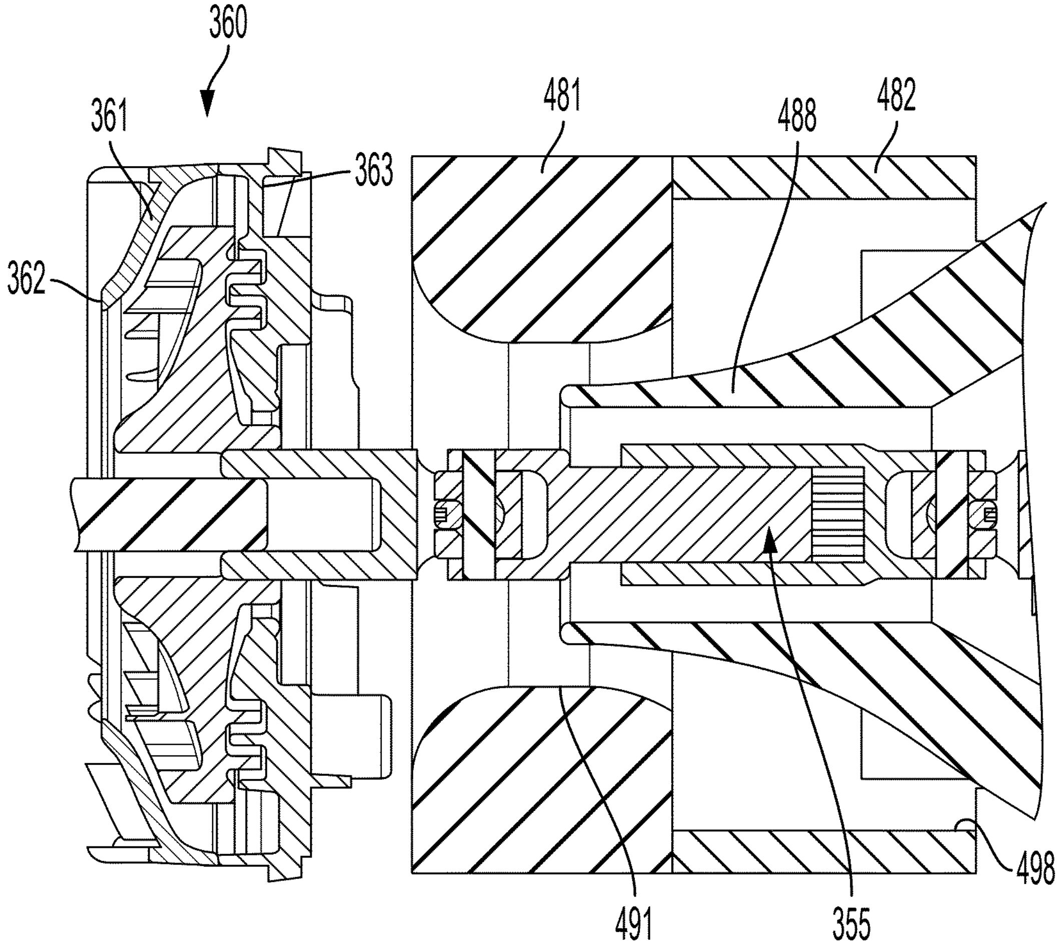
FIG. 18 is a cross-sectional side view of a portion of an exemplary embodiment of an oscillating tool.

FIGS. 16, 17 and 18 illustrate another exemplary embodiment of an oscillating tool 1100. The exemplary embodiment of the oscillating tool 1100 may be the same as or similar to the oscillating tools 100 and 1000 previously described unless other, unless otherwise shown or described. For example, the oscillating tool 1100 may be powered by a battery pack 150, include housing parts 111, 112 and 113, include the trigger 21 and include the clamp assembly 200. Additionally, parts, features, elements or components of the oscillating tool 100, 1000 and 1100 may be substituted for each other or combined with each other, as applicable.

FIG. 16 is a cross-sectional side view of a portion of internal components of oscillating tool 1100. FIG. 17 is a side view of a front portion of the oscillating tool 1100 with housing parts 111, 112 and 113 removed for ease of illustration.

As shown in FIG. 16, the oscillating tool 1100 includes a mixed flow fan 360. The mixed flow fan 360 pulls air in from behind the fan 360, through the motor 50. The mixed flow fan 360 also pushes air forward towards a headbox 480. As shown in FIG. 17, the headbox 480 may be designed to further direct air towards a cutting area.

As shown in FIG. 16, the fan 360 is forward of the motor 50. The fan is disposed on an output shaft of the motor 50 and is driven by the motor 50. The fan 360 may include a chute 361 to direct air. In the example embodiment of FIG. 16, the chute 361 includes an inlet 362 adjacent to the motor 50 and an outlet 363 opposite the inlet 362. The inlet 362 has a smaller diameter than the outlet 363. The outlet 363 may have a diameter that is 1.2 to 10 times as large as the diameter of the inlet 362; 1.4 to 10 times as large as the diameter of the inlet 362; 1.6 to 10 times as large as the diameter of the inlet 362; 1.8 to 10 times as large as the diameter of the inlet 362; 2 to 10 times as large as the diameter of the inlet 362; or 3 to 10 times as large as the diameter of the inlet 362. In other example embodiments, the inlet 362 may be the substantially the same size as the outlet 363 or larger than the outlet 363. For example, the inlet 362 may have a diameter that is 1.2 to 10 times as large as the diameter of the outlet 363; 1.4 to 10 times as large as the diameter of the outlet 363; 1.6 to 10 times as large as the diameter of the outlet 363; 1.8 to 10 times as large as the diameter of the outlet 363; 2 to 10 times as large as the diameter of the outlet 363; or 3 to 10 times as large as the diameter of the outlet 363.

As shown in FIG. 16, the exemplary embodiment of an oscillating tool 1100 further includes a venturi inlet 481 and a baffle 482 to direct airflow AF. As shown in FIG. 16, airflow AF is pulled through the motor 50, through the inlet 362 out of the outlet 363. Then, the airflow AF continues through venturi inlet 481 and through the baffle 482 between the baffle 482 and a rear portion of headbox 480. The airflow AF continues over a top of the headbox 480 and out a front of the oscillating tool 1100. As shown in FIG. 17, the airflow AF may continue to a position near the accessory 210 and, in particular, to a front of an accessory 210 at which a workpiece 499 is being cut, sanded or otherwise worked upon. As will be appreciated, a housing of the oscillating tool 1100 may have inlets and outlets to direct and accommodate an airflow. In particular, outlets may be made in a forward housing 113. Inlets may be formed at various locations in housings 111 and 112.

In the example embodiment, the headbox 480 includes the venturi inlet 481 and the baffle 482. For example, as shown in FIG. 17, the headbox 480 includes a forward portion 487. The forward portion 487 tapers rearwardly to an inner portion 488. The inner portion 488 surrounds a portion of shaft 355, as shown in FIG. 16. As shown in FIG. 17, the forward portion 487 is connected to baffle 482 by a plurality of connecting portions 584. FIG. 17 shows two connecting portions 485. In the example embodiment, there are two corresponding connecting portions 485 on the opposite side of the oscillating tool 1100 so that there are four connecting portions 485 consisting of two on each side. In other embodiments there may be more or fewer connecting portions 485. The venturi inlet 481 is adjacent to the baffle 482.

The forward portion 487 of the headbox 480 houses bearings 220 and 221 and at least a portion of shaft 206.

As shown in FIGS. 16 and 17, in the example embodiment, the outer surfaces of the baffle 482 and the venturi inlet 481 are generally aligned. That is, the baffle 482 and the venturi inlet 481 of the example embodiment generally have the same outer diameter. As shown in FIG. 16, the inner surfaces and diameters of the venturi inlet 481 and the baffle 482 differ in size and shape. In particular, as shown in FIG. 16, the venturi inlet has a generally curved inner surface 491. The generally curved inner surface 491 of the venturi inlet 481. The venturi inlet 481 is widest at a rear end facing the fan 360. The inlet 481 narrows towards a center portion and then expands again towards a front end adjacent to the baffle 482. The narrowest or minimum diameter portion may be near an axial center of the inlet 481. In the example embodiment, the narrowest or minimum diameter portion of the venturi inlet 481 may have a diameter that is 90% or less of a maximum diameter of the venturi inlet 481, 80% or less of a maximum diameter of the venturi inlet 481; 70% or less of a maximum diameter of the venturi inlet 481; 60% or less of a maximum diameter of the venturi inlet 481; 50% or less of a maximum diameter of the venturi inlet 481. The narrowest or minimum diameter portion of the venturi inlet 481 may have a diameter that is 90% or less of a diameter of the rear end of the venturi inlet 481, 80% or less of a maximum diameter of the rear end of the venturi inlet 481; 70% or less of a maximum diameter of the rear end of the venturi inlet 481; 60% or less of a maximum diameter of the rear end of the venturi inlet 481; 50% or less of a maximum diameter of the rear end of the venturi inlet 481. The narrowest or minimum diameter portion of the venturi inlet 481 may have a diameter that is 90% or less of a diameter of the front end of the venturi inlet 481, 80% or less of a maximum diameter of the front end of the venturi inlet 481; 70% or less of a maximum diameter of the front end of the venturi inlet 481; 60% or less of a maximum diameter of the front end of the venturi inlet 481; 50% or less of a maximum diameter of the front end of the venturi inlet 481.

In the example embodiment, the headbox 480 may include the baffle 482, the venturi inlet 481 and the connecting portions 485 and these parts may be made as a single integral part. The headbox 480 may be made, for example, by casting. The headbox 480 may be made of metal. The metal may include at least one of steel, aluminum and chrome. In some example embodiments, one or more of the baffle 482, the venturi inlet 481 and the connecting portions 485 may be made as a separate part. For example, the venturi inlet 481 may be made as a separate part and connected to the baffle 482 by welding, fasteners, adhesives or another attachment method or mechanism. The venturi inlet 481 may be made of a different material than the baffle 482 or the forward part of the headbox 480. The venturi inlet 481 may be made of plastic. The fan 360 may be made of, for example, at least one of metal or plastic.

In the example embodiment, the baffle 482 has an inner surface 498 that is substantially flat. The baffle 482 may have a larger inner diameter (i.e., diameter to the inner surface 498) than a maximum diameter of the venturi inlet 481. The baffle 482 may have an inner diameter that is larger than the diameter of the front end of the venturi inlet 481. The baffle 482 may have an inner diameter that is larger than the diameter of the rear end of the venturi inlet 481.

The fan 360 may direct air from the motor to the venturi inlet 481, through the baffle and over the front of the headbox 480.

Figure 19:
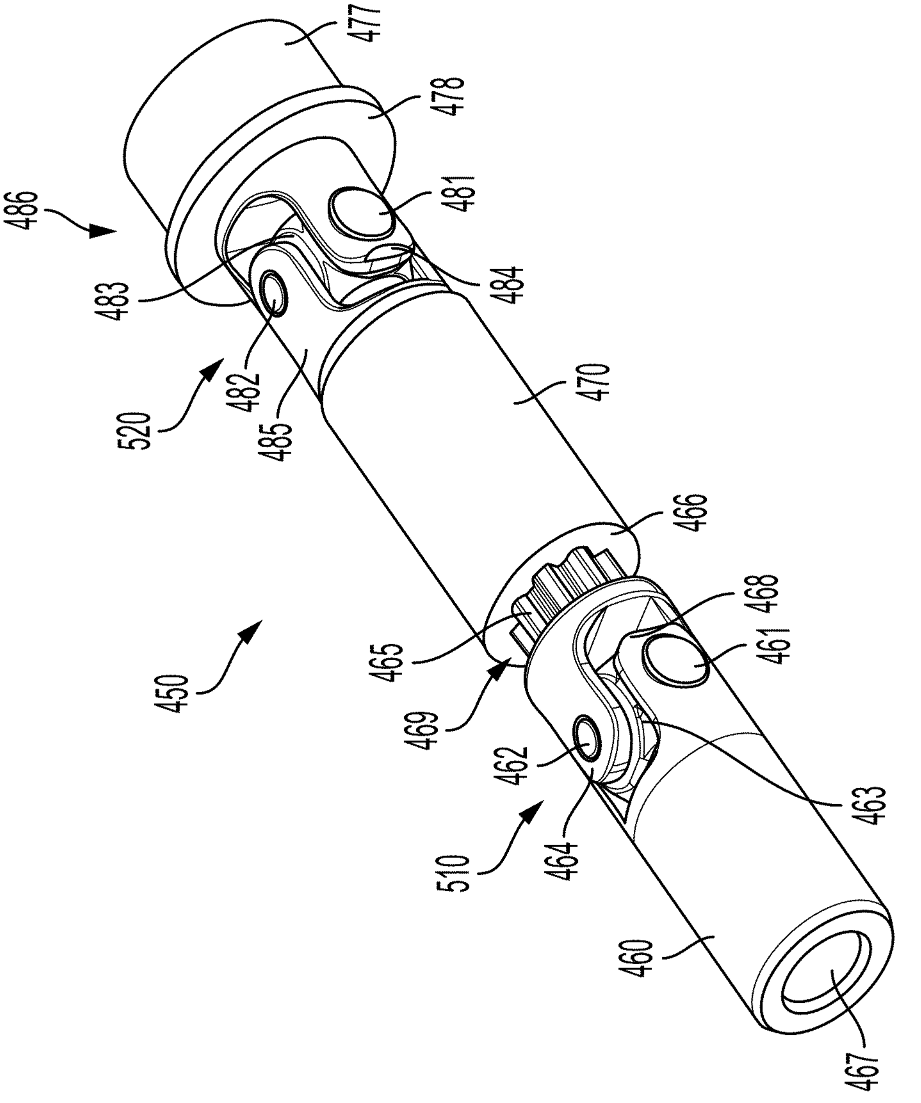
FIG. 19 is a perspective view of an internal rotating shaft of an exemplary embodiment.
Figure 20:
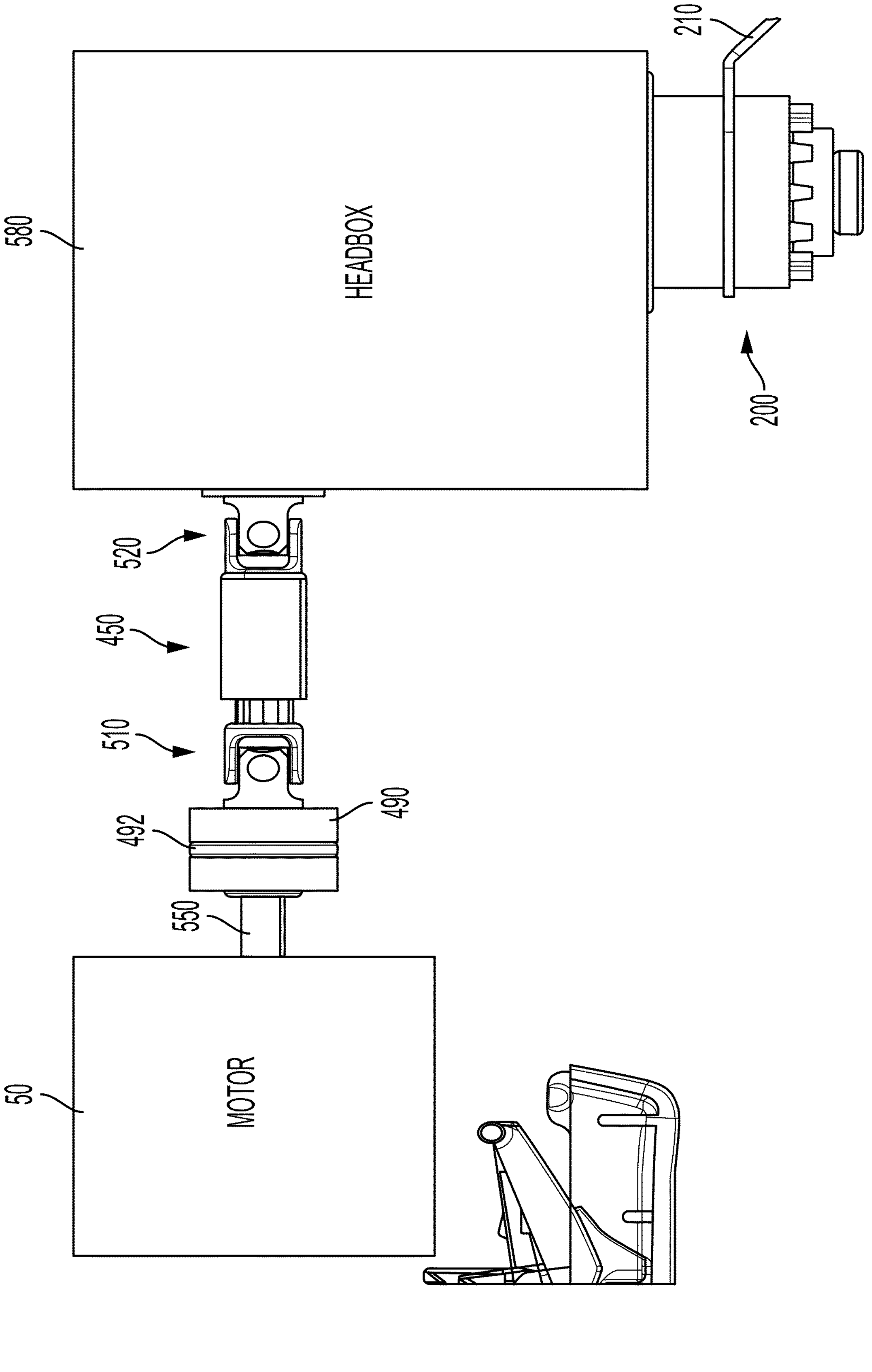
FIG. 20 is a side view of an exemplary embodiment of an oscillating tool.
Figure 21:
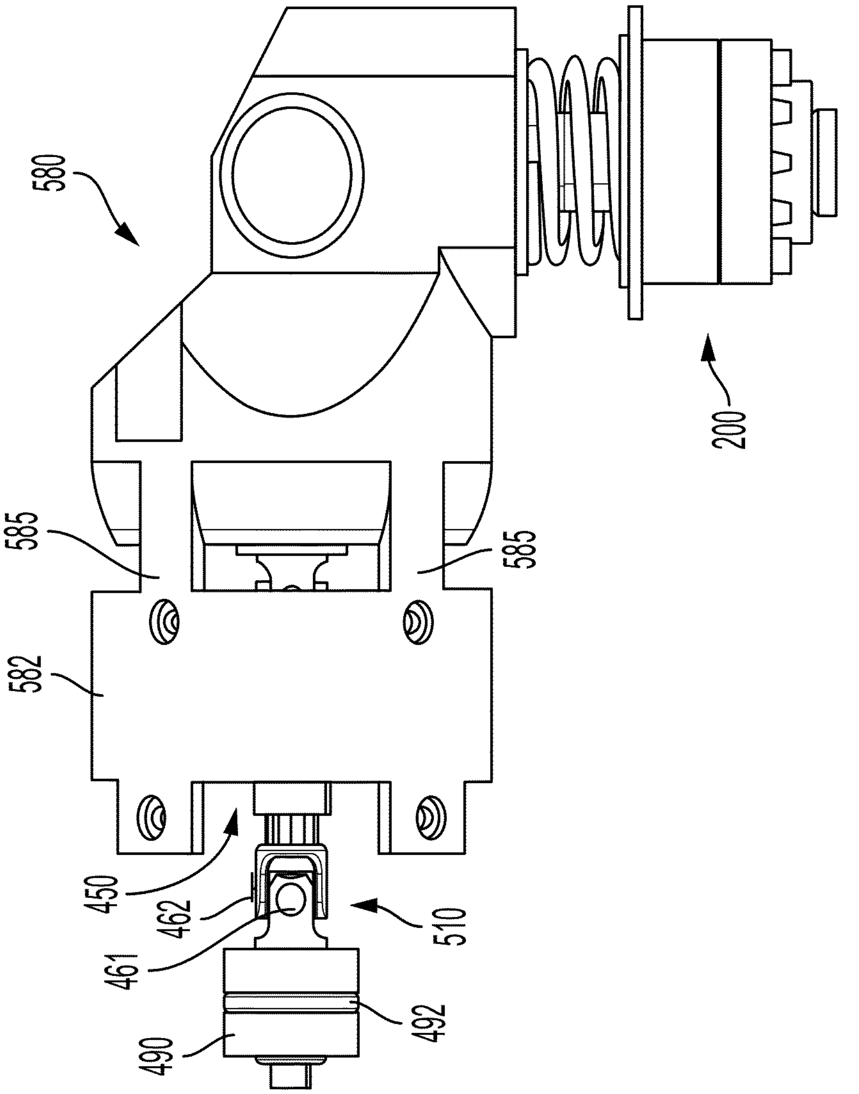
FIG. 21 is a side view of an exemplary embodiment of an oscillating tool.

FIGS. 19-21 illustrate parts of an oscillating tool including an exemplary embodiment of a rotating internal shaft 450. FIG. 19 illustrates an exemplary embodiment of the shaft 450. FIG. 20 illustrates the shaft 450 as schematically extending between the motor 50 and a headbox 580 of an exemplary embodiment of an oscillating tool. FIG. 21 illustrates the shaft 450 and a headbox 580. FIGS. 19-21 illustrate portions of an oscillating tool, in particular, an exemplary embodiment of a shaft 450. The shaft 450 and other components are used in an oscillating tool and the features, elements, components of FIGS. 19-21 may be incorporated into, substituted for or otherwise used with other embodiments, such as the oscillating tools 100, 1000 and 1,100.

As shown in FIG. 20, the oscillating tool includes the motor 50. The motor 50 may be the same motor 50 as in previous embodiments or may be a different motor 50. The motor may be a brushless DC motor, a brushed DC motor, an AC motor, a universal motor, or another type of motor.

The motor 50 includes an output shaft 550. The rotating internal shaft 450 is operatively connected to the output shaft 550 and driven by the motor. The rotating internal shaft 450 of the example embodiment is a double joint shaft 450. In particular, the shaft 450 of the example embodiment is a double U-joint shaft. The double joint shaft 450 extends from the motor 50 and motor output shaft 550 to an area of the headbox 580. The double joint shaft 450 is operationally connected at a front end to an eccentric such as eccentric bearing 92 or eccentric shaft 392. Accordingly, the motor 50 drives the output shaft 206 and clamp 200 through the double joint shaft 450.

As shown in FIG. 20, one or more support bearings 490 may be on the double joint shaft 450. The support bearing 490 may help support the shaft 450 and facilitate rotation of the shaft 450. The support bearing 490 may include a rubber O-ring 492.

A perspective illustration of the double U-joint shaft 450 is shown in FIG. 19. As shown, the shaft 450 includes a first or rear portion 460, a second or middle portion 470 and a third or front portion 487. The first portion 460 is adjacent to the motor 50 and engages the motor output shaft 550. In the example embodiment, the first portion 460 is generally cylindrical. The first portion 460 includes a central bore 467. The motor output shaft 550 may slide into and engage with the central bore 467. The motor output shaft 550 and the first portion 460 may be rotationally engaged by one or more of frictional fit, adhesive, fasteners, welding or a mechanical engagement such as spline and grooves or a hexagonal engagement, for example. A hexagonal engagement may, for example, include an outer portion of the motor output shaft 550 having a hexagonal shape and the central bore 467 having a receiving hexagonal shape. In the example embodiment, the shaft 450 is a separate component attached to a motor output shaft 550 so that they are operationally engaged and when the motor output shaft 550 rotates, the double U-joint shaft rotates along with the motor output shaft 550. In other embodiments, the first portion of the joint shaft 450 may be made integral with the motor output shaft 550.

As shown in, for example, FIG. 19, the shaft 450 has two joints 510 and 520. The joints 510 of the example embodiment are double joints and, in particular, double U-joints. The double joints allow for jointed rotation along two axes. In the example embodiment, the double joints 510, 520 each allow for jointed rotation about a first axis that is generally perpendicular to a longitudinal axis of the oscillating tool and is in a generally horizontal plane. The double joints 510, 520 also each allow for rotation about a second axis that is generally perpendicular to a longitudinal axis of the oscillating tool and is in a generally vertical plane. In other embodiments, the first and second axes may be of a different orientation. Also, double joint 510 and double joint 520 may have different rotational axes from one another.

As shown in FIG. 19, the first U-joint 510 includes a first U-shaped portion 468 and a second U-shaped portion 464. Each of the first U-shaped portion 468 and the second U-shaped portion 464 include a pair of arms and forms a generally U-shape. A joint member 463 is disposed between the pairs of arms. In particular, sides of the joint member 463 are surrounded at the left and right sides by arms of the first U-shaped portion 468. A top and bottom of the joint member 463 are surrounded by arms of the second U-shaped portion 464. Pin 461 extends through both arms of the first U-shaped portion 468 and the joint member 463 and defines the first axis. Pin 461 may include a hole near a central portion thereof. Pin 462 extends through both arms of the second U-shaped portion 464, the joint member 463 and through the hole formed in pin 461.

In the example embodiment, pin 461 includes a hole so that pin 462 may extend through pin 461 and so through the joint member 463 and both arms of the second U-shaped portion 464. As shown in FIG. 19, pin 461 has a larger diameter than pin 462. This allows for pin 461 to have the hole and that the hole be large enough for the pin 462 to extend through. In other embodiments, pin 462 may have a larger diameter and include a hole for pin 461 to extend through.

In some embodiments, instead of a single pin 461 and a single pin 462, there may be two of either or both. For example, instead of a single pin 461 extending through both arms of the first U-shaped portion 468 and the joint member 463, a first pin may extend through one arm of the first U-shaped portion 468 and into the joint member 463. A second pin along a same axis of the first pin may extend through the other arm of the first U-shaped portion 468 and into the joint member 463. In this example embodiment, since a single pin 461 does not extend fully through the joint member 463, it may not interfere with a single pin 462 extending full through the joint member 463. That is, rather than having a hole through a single pin 461, a pair of pins may be used so as to not require a hold for a single pin 462 to pass through. Alternatively or additionally, a pair of pins may be used in place of a single pin 462.

The second U-shaped joint 520 may be the same as or similar to the first U-shaped joint 510 or example embodiments thereof. As shown in FIG. 19, the second U-shaped joint 520 includes a second joint member 483, a third U-shaped portion 484 and a fourth U-shaped portion 485. Second joint member 483 is bordered on either side by arms of third U-shaped portion 484 and is bordered at a top and bottom by arms of fourth U-shaped portion 485. A third pin 471 extends through both arms of the third U-shaped portion 484 and defines a third axis of rotation, parallel to the first axis defined by pin 461. Fourth pin extends through both arms of the fourth U-shaped pin portion 485 and defines a fourth axis of rotation parallel to the second axis defined by pin 462.

First U-shaped joint 510 allows the second or middle portion 470 of shaft 450 to rotate relative to first portion 460 around two axes. Second U-shaped joint 520 allows the third or forward portion 487 to rotate relative to the second or middle portion 470 of the shaft 450 about two axes.

Figure 22:
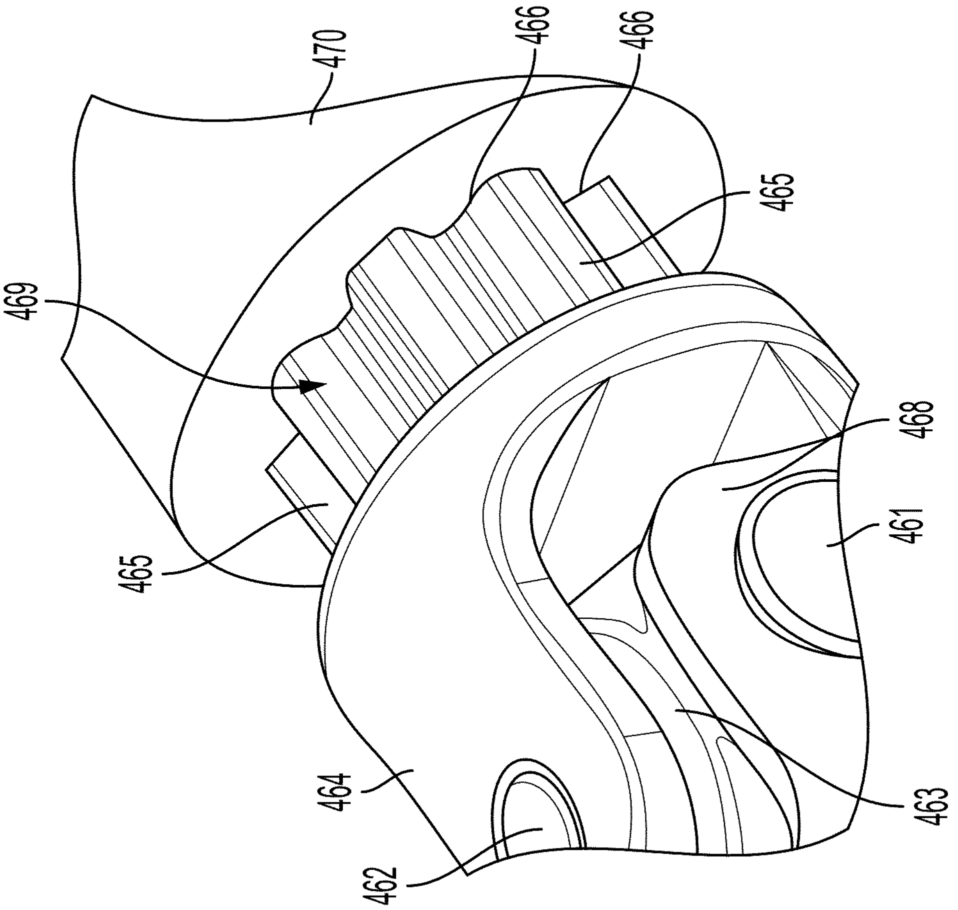
FIG. 22 is a close-up view of a portion of an internal rotating shaft of an exemplary embodiment.
Figure 23:
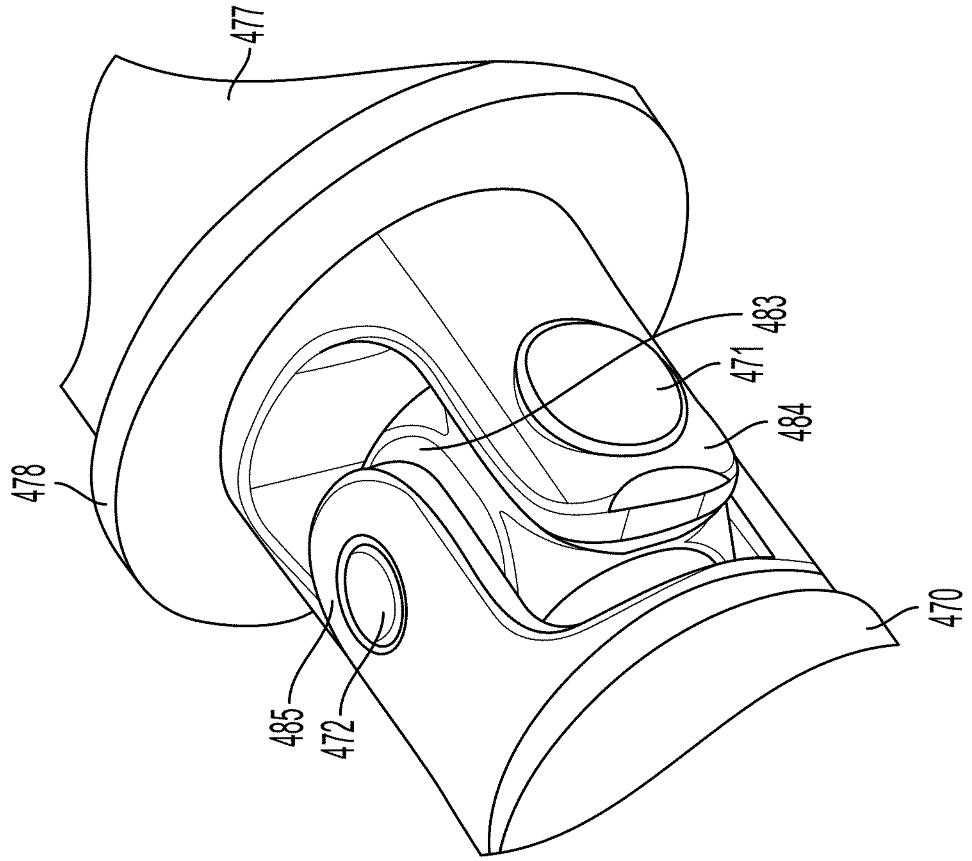
FIG. 23 is a close-up view of a portion of an internal rotating shaft of an exemplary embodiment.

As further shown in FIG. 19, the second portion 470 of shaft 450 has a generally cylindrical shape. Second portion 470 includes at least a partially hollow portion including grooves and splines 466. First portion 460 includes a projecting portion 469 including grooves and splines 465 that are complementary to the grooves and splines 466 such that the projecting portion 469 fits internally into the hollow center of second portion 470. The splines and grooves 465, 466 mesh so that rotation of the first portion 460 of the shaft 450 is transferred to the second portion 470 of the shaft 450. The projecting portion 469 may move axially so that more or less of the projecting portion 469 is in the second portion 470. This allows relative axial movement of the first portion 460 of the shaft 450 and the second portion 470 of the shaft 450 such that the shaft 450 may be axially compressed or extended. FIG. 22 illustrates a close-up view of the splines and grooves 465, 466. FIG. 23 illustrates a close-up view of second joint 520.

The projecting portion 469 may be sized such that there is significant projection into the second portion 470 of the shaft 450 so that the projecting portion 469 cannot fall out of the second portion 470 of the shaft. The second portion 470 of the shaft 450 may be hollow throughout or at a portion thereof. The second portion 470 of the shaft 450 may have one or more internal stops that prevent the projecting portion 469 from additional insertion into the second portion 470 of the shaft 450.

As shown, the third portion 486 of the shaft has a ledge 478 and a transfer part 477. The third portion 486 may be configured in a manner to transfer rotational power to an eccentric. For example, transfer part 477 may include parts the same as or similar to connecting portion 356 in order to transfer rotational power to an eccentric.

FIG. 21 illustrates the shaft 450 assembled with a headbox part 580. The headbox 580 may be the same as or similar to the headboxes described with respect to other exemplary embodiments or include parts the same as or similar to the headboxes described with respect to other exemplary embodiments. The headbox 580 illustrated in FIG. 21 includes a forward portion, a plurality of connecting portions 585 and a baffle 582. In some embodiments, the headbox 580 may also include a venturi inlet.

The example embodiment of the shaft 450 serves to help separate vibration from the motor area to the headbox area. In particular, a less rigid connection is formed between the motor 50 and the headbox 580, while rotational power from the motor 50 is still transferred to the output shaft to provide for oscillating motion of the clamp. This allows for separate vibration control between the headbox 580 and the motor 50. For example, vibration can be optimized at least somewhat independently for the headbox 580 and the motor 50. This allows sufficient vibration in the headbox 580 for favorable cutting performance and reduced vibration in the motor for improved user comfort.

The headbox 580 may be a floating headbox. The floating headbox may not be rigidly grounded to the housing of the oscillating tool 111, 112, 113. Instead, the headbox 580 may be held by a compliant material such as foam or rubber rather than a more rigid method such as fasteners.

The foregoing description of the embodiments has been provided for purposes of illustration and description. It is not intended to be exhaustive or to limit the disclosure. Individual elements or features of a particular embodiment are generally not limited to that particular embodiment, but, where applicable, and can be combined, added to or exchanged with features or elements in other embodiments. The same may also be varied in many ways. Such variations are not to be regarded as a departure from the disclosure, and all such modifications are intended to be included within the scope of the disclosure.

Additionally, while exemplary embodiments are described with respect to an oscillating tool, the methods and configurations may also apply to or encompass other power tools such as other tools that hold power tools accessories.

What is claimed is:

1. An oscillating tool, comprising:

a housing;

a motor in the housing;

a fan driven by the motor;

a headbox having a forward portion;

a venturi inlet disposed between the fan and the forward portion of the headbox in an axial direction extending along a longitudinal axis of the oscillating tool;

an output shaft driven by the motor, the output shaft configured to move in an oscillating motion, wherein at least a portion of the output shaft is in the forward portion of the headbox;

a clamp configured to hold an accessory, the clamp configured to be driven by the motor through the output shaft in an oscillating motion; and at least one bearing supporting the output shaft, wherein the fan comprises a mixed flow fan, and wherein the fan is configured to push air into the venturi inlet.

2. The oscillating tool of claim 1, wherein the fan is configured to pull air through the motor towards the fan.

3. The oscillating tool of claim 1, further comprising a baffle adjacent to the venturi inlet and disposed between the venturi inlet and the forward portion of the headbox in the axial direction, wherein the fan is configured to push air into the venturi inlet and the baffle.

4. The oscillating tool of claim 3, wherein the venturi inlet and the baffle are part of the headbox.

5. The oscillating tool of claim 1, wherein the fan is configured to push air in the axial direction over an upper side of the forward portion of the headbox opposite of a lower side of the forward portion of the headbox on which the clamp is disposed.

6. The oscillating tool of claim 1, wherein the fan is configured to push air in the axial direction toward the forward portion of the headbox to cool the headbox.

7. The oscillating tool of claim 1, wherein the fan is configured to push air out of the oscillating tool in the axial direction and towards a work area at which the accessory is performing work.

8. The oscillating tool of claim 1, wherein the venturi inlet has a rear end facing the fan, a front end opposite of the rear end, and a center portion disposed between the front end and the rear end in the axial direction, the center portion forming an opening that is narrower than an opening formed by either of the front end and the rear end.

9. An oscillating tool, comprising:

a housing;

a motor in the housing;

a fan driven by the motor;

a headbox having a forward portion;

a venturi inlet disposed between the fan and the forward portion of the headbox in an axial direction extending along a longitudinal axis of the oscillating tool;

a baffle adjacent to the venturi inlet;

an output shaft driven by the motor, the output shaft configured to move in an oscillating motion, wherein at least a portion of the output shaft is in the forward portion of the headbox;

a clamp configured to hold an accessory, the clamp configured to be driven by the motor through the output shaft in an oscillating motion; and at least one bearing supporting the output shaft, wherein the at least one bearing is housed in the headbox, and wherein the fan is configured to push air into the venturi inlet and the baffle.

10. The oscillating tool of claim 9, wherein the venturi inlet and the baffle are part of the headbox.

11. The oscillating tool of claim 9, wherein the venturi inlet, the baffle and the forward portion of the headbox are formed together as an integral part.

12. The oscillating tool of claim 9, wherein the fan is configured to push air in the axial direction over an upper side of the forward portion of the headbox opposite of a lower side of the forward portion of the headbox on which the clamp is disposed.

13. The oscillating tool of claim 9, wherein the fan is configured to push air in the axial direction toward the forward portion of the headbox to cool the headbox.

14. The oscillating tool of claim 9, wherein the fan is configured to push air out of the oscillating tool in the axial direction and towards a work area at which the accessory is performing work.

15. The oscillating tool of claim 14, wherein the housing comprises an outlet directed in the axial direction towards the work area.

16. The oscillating tool of claim 9, wherein the venturi inlet has a rear end facing the fan, a front end opposite of the rear end, and a center portion disposed between the front end and the rear end in the axial direction, the center portion forming an opening that is narrower than an opening formed by either of the front end and the rear end.

17. An oscillating tool, comprising:

a housing;

a motor in the housing;

a fan driven by the motor;

a headbox having a forward portion; wherein the fan is disposed between the motor and the forward portion of the headbox in an axial direction extending along a longitudinal axis of the oscillating tool;

an output shaft driven by the motor, the output shaft configured to move in an oscillating motion, wherein at least a portion of the output shaft is in the forward portion of the headbox;

a clamp configured to hold an accessory, the clamp configured to be driven by the motor through the output shaft in an oscillating motion; and at least one bearing supporting the output shaft, wherein the fan is configured to push air in the axial direction over an upper side of the forward portion of the headbox opposite of a lower side of the forward portion of the headbox on which the clamp is disposed, and wherein the headbox comprises a venturi inlet disposed between the fan and the forward portion of the headbox in the axial direction.

18. The oscillating tool of claim 17, wherein the headbox comprises a baffle adjacent to the venturi inlet and disposed between the venturi inlet and the forward portion of the headbox in the axial direction, and wherein the fan is configured to push air into the venturi inlet and the baffle.

19. The oscillating tool of claim 17, wherein the venturi inlet has a rear end facing the fan, a front end opposite of the rear end, and a center portion disposed between the front end and the rear end in the axial direction, the center portion forming an opening that is narrower than an opening formed by either of the front end and the rear end.

* * * * *